(12) United States Patent
Hara et al.

(10) Patent No.: US 6,976,741 B2
(45) Date of Patent: Dec. 20, 2005

(54) BRAKE CONTROL SYSTEM FOR VEHICLE AND METHOD FOR CONTROLLING BRAKE SYSTEM

(75) Inventors: Masahiro Hara, Susono (JP); Toshihisa Nihei, Mishima (JP); Naruyuki Matsui, Gotemba (JP); Masahiro Matsuura, Chiryu (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 154 days.

(21) Appl. No.: 10/153,708

(22) Filed: May 24, 2002

(65) Prior Publication Data

US 2002/0180262 A1 Dec. 5, 2002

(30) Foreign Application Priority Data

May 30, 2001 (JP) .............................. 2001-163211

(51) Int. Cl.$^7$ ............................ B60T 8/34; B60T 8/66; B60T 7/12
(52) U.S. Cl. ................... 303/113.1; 303/155; 303/166; 303/167; 303/116.1; 303/119.1; 303/DIG. 2; 701/78
(58) Field of Search .................... 303/3, 5, 15, 155, 303/167, 166, 116.1, 116.2, 119.1, DIG. 1, 303/DIG. 2, DIG. 4, DIG. 10, 113.1, DIG. 3; 701/70, 71, 78, 79, 83

(56) References Cited

U.S. PATENT DOCUMENTS

| | | | |
|---|---|---|---|
| 4,805,104 A * | 2/1989 | Kishimoto et al. ........... 701/70 |
| 5,403,075 A * | 4/1995 | Fujioka ....................... 303/166 |
| 5,669,678 A * | 9/1997 | Stumpe et al. .............. 303/155 |
| 5,934,767 A | 8/1999 | Schmidt et al. ............. 303/155 |
| 6,254,198 B1 | 7/2001 | Zittlau |
| 6,422,662 B1 * | 7/2002 | Haas .......................... 303/155 |
| 6,532,411 B2 * | 3/2003 | Manaka et al. ............... 701/70 |
| 2002/0180267 A1 * | 12/2002 | Hara et al. |

FOREIGN PATENT DOCUMENTS

| | | |
|---|---|---|
| DE | 198 13 194 C2 | 10/1999 |
| EP | 0 832 019 B1 | 4/1998 |
| JP | A 4-63755 | 2/1992 |
| JP | 11208432 A * | 8/1999 |

* cited by examiner

*Primary Examiner*—Thomas Williams
(74) *Attorney, Agent, or Firm*—Oliff & Berridge, PLC

(57) ABSTRACT

In a brake control system for a vehicle, a target wheel cylinder pressure of each wheel is calculated in accordance with a braking force applied by the driver, a brake control mode is determined to be one of an increase pressure mode, a decrease pressure mode, or a maintain pressure mode, and a target increase/decrease force slope is calculated in accordance with a slip amount of the wheel. In particular, the target wheel cylinder pressure is calculated based on actual wheel cylinder pressure and the target increase/decrease pressure slope, set on the target increase/decrease force slope when starting anti-skid control, the target wheel cylinder pressure is calculated after starting the anti-skid control based on the most recent target wheel cylinder pressure and the target increase/decrease pressure slope, and the wheel cylinder pressure Pi is controlled so as to become equal to the target wheel cylinder pressure.

15 Claims, 13 Drawing Sheets ized wheel cylinder pressure. Or, when using an electronic brake control system, this is done by properly setting the target pressing force and controlling the pressure exerting device so that the pressing force becomes equal to that target pressing force.

BRAKE CONTROL SYSTEM FOR VEHICLE AND METHOD FOR CONTROLLING BRAKE SYSTEM

INCORPORATION BY REFERENCE

The disclosure of Japanese Patent Application No. 2001-163211 filed on May 30, 2001, including the specification, drawings and abstract is incorporated herein by reference in its entirety.

BACKGROUND OF THE INVENTION

1. Field of Invention

The invention relates generally to brake control systems of a vehicle and methods for controlling brake systems, and more specifically to brake control systems of a vehicle and methods for controlling braking by selectively increasing and decreasing braking power of a wheel.

2. Description of Related Art

As an example of a brake control system of a vehicle such as an automobile, a brake control system such as that disclosed in Japanese Patent Application Laid-Open Publication No. 4-63755, which is constructed so as to perform anti-skid control by controlling so as to selectively increase and decrease wheel cylinder pressure with a differential pressure control valve, for example, has been known.

According to the above brake control system, the wheel cylinder pressure is able to be controlled to selectively increase and decrease linearly by controlling a control current to the differential pressure control valve. Therefore, abnormal noise generated during brake control, as well as kickback, are able to be reduced compared to when a switching valve, which is a valve to control an increase/decrease in pressure, is controlled so as to continuously switch.

According to the aforementioned brake control system, however, the wheel cylinder pressure is only selectively increased and decreased by the differential pressure control valve without the actual wheel cylinder pressure being detected. As a result, the wheel cylinder pressure is not able to be properly controlled with good accuracy to a target pressure. There is therefore room for improvement on this point in order to improve brake control performance, such as anti-skid control, of a vehicle.

Moreover, an electronic brake control system having an electronic pressure exerting device such as an electric motor for pressing a friction member such as a brake pad against a rotating member such as a brake rotor provided in a wheel has also been known. In this type of electronic brake control system as well, in order to accurately control the brake force, the target pressing force of the pressure exerting device must be properly set based on the state of the vehicle and the pressure exerting device must be controlled so that the difference between the target pressing force and the pressing force of the friction member against the rotating member detected by a pressing force sensor is reduced.

SUMMARY OF THE INVENTION

A main object of the invention is to improve brake control performance, such as anti-skid control, of a vehicle by properly controlling with good accuracy a brake force of a wheel to a target brake force. When the wheel cylinder pressure is selectively increase and decrease, this is done by properly setting the target wheel cylinder pressure and controlling the wheel cylinder pressure becomes equal to the target wheel cylinder pressure. Or, when using an electronic brake control system, this is done by properly setting the target pressing force and controlling the pressure exerting device so that the pressing force becomes equal to that target pressing force.

A first aspect of the invention relates to a brake control system for a vehicle, which has a linear valve that selectively increases and decreases wheel cylinder pressure by controlling a supply and discharge of an operating fluid with respect to a wheel cylinder provided for each wheel, a detector that detects the actual wheel cylinder pressure, and a controller that obtains a target increase/decrease pressure slope of the wheel cylinder pressure in accordance with a rotating state of the wheel, calculates a target wheel cylinder pressure based on the target increase/decrease pressure slope and the detected actual wheel cylinder pressure when starting brake control, and controls the linear valve such that the wheel cylinder pressure becomes equal to the target wheel cylinder pressure.

According to the brake control system according to the first aspect of the invention, the target increase/decrease pressure slope of the wheel cylinder pressure is obtained in accordance with the rotating state of the wheel, the target wheel cylinder pressure is calculated based on the target increase/decrease pressure slope and the detected actual wheel cylinder pressure when starting the predetermined brake control operation, and the linear valve is controlled such that the wheel cylinder pressure becomes equal to the target wheel cylinder pressure. As a result, the target wheel cylinder pressure is calculated to a proper value in accordance with the rotating state of the wheel based on the detected actual wheel cylinder pressure when starting the predetermined brake control operation, and thus the wheel cylinder pressure is controlled to a proper value in accordance with the rotating state of the wheel.

A second aspect of the invention relates to a brake control system for a vehicle, which has an electromagnetic pressure exerting device that selectively increases and decreases a pressing force of a friction material against a rotating member provided in a wheel, a detector that detects the actual pressing force, and a controller that obtains a target increase/decrease force slope of the pressing force in accordance with a rotating state of the wheel, calculates a target wheel pressing force based on the target increase/decrease force slope and the detected actual pressing force when starting a predetermined brake control operation, and controls the pressure exerting device such that the pressing force becomes equal to the target pressing force.

According to the brake control system according to the second aspect of the invention, the target increase/decrease force slope of the pressing force is obtained in accordance with the rotating state of the wheel, the target pressing force is calculated based on the target increase/decrease force slope and the detected actual pressing force when starting the predetermined brake control operation, and the pressure exerting device is controlled such that the pressing force becomes equal to the target pressing force. As a result, the target pressing force is calculated to a proper value in accordance with the rotating state of the wheel based on the detected actual pressing force when starting the predetermined brake control operation, and thus the pressing force is controlled to a proper value in accordance with the rotating state of the wheel.

A third aspect of the invention relates to a method of controlling a brake system for a vehicle. This control method includes a step of determining whether a condition for starting a predetermined brake control operation has been fulfilled, a step of obtaining a target increase/decrease pressure slope of the wheel cylinder pressure in accordance with a rotating state of a wheel of the vehicle, a step of detecting actual wheel cylinder pressure, a step of calculating the target wheel cylinder pressure based on the target increase/decrease pressure slope and the detected actual wheel cylinder pressure when starting the predetermined brake control operation if it was determined that the condition for starting the predetermined brake control operation has been fulfilled, and a step of controlling the linear valve such that the wheel cylinder pressure becomes equal to the target wheel cylinder pressure.

A fourth aspect of the invention relates to a method of controlling a brake system for a vehicle, which has an electromagnetic pressure exerting device for selectively increasing and decreasing a pressing force of a friction member against a rotating member provided in a wheel. This control method includes a step of determining whether a condition for starting a predetermined brake control operation has been fulfilled, a step of obtaining a target increase/decrease pressure slope of the pressing force in accordance with a rotating state of the wheel, a step of detecting actual pressing force, a step of calculating a target pressing force based on the target increase/decrease pressure slope and the detected actual pressing force when starting the predetermined brake control operation, and a step of controlling the pressure exerting device such that the pressing force becomes equal to the target pressing force.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Hereinafter, several preferred embodiments of the invention will be described in detail with reference to the attached drawings.

Figure 1A:
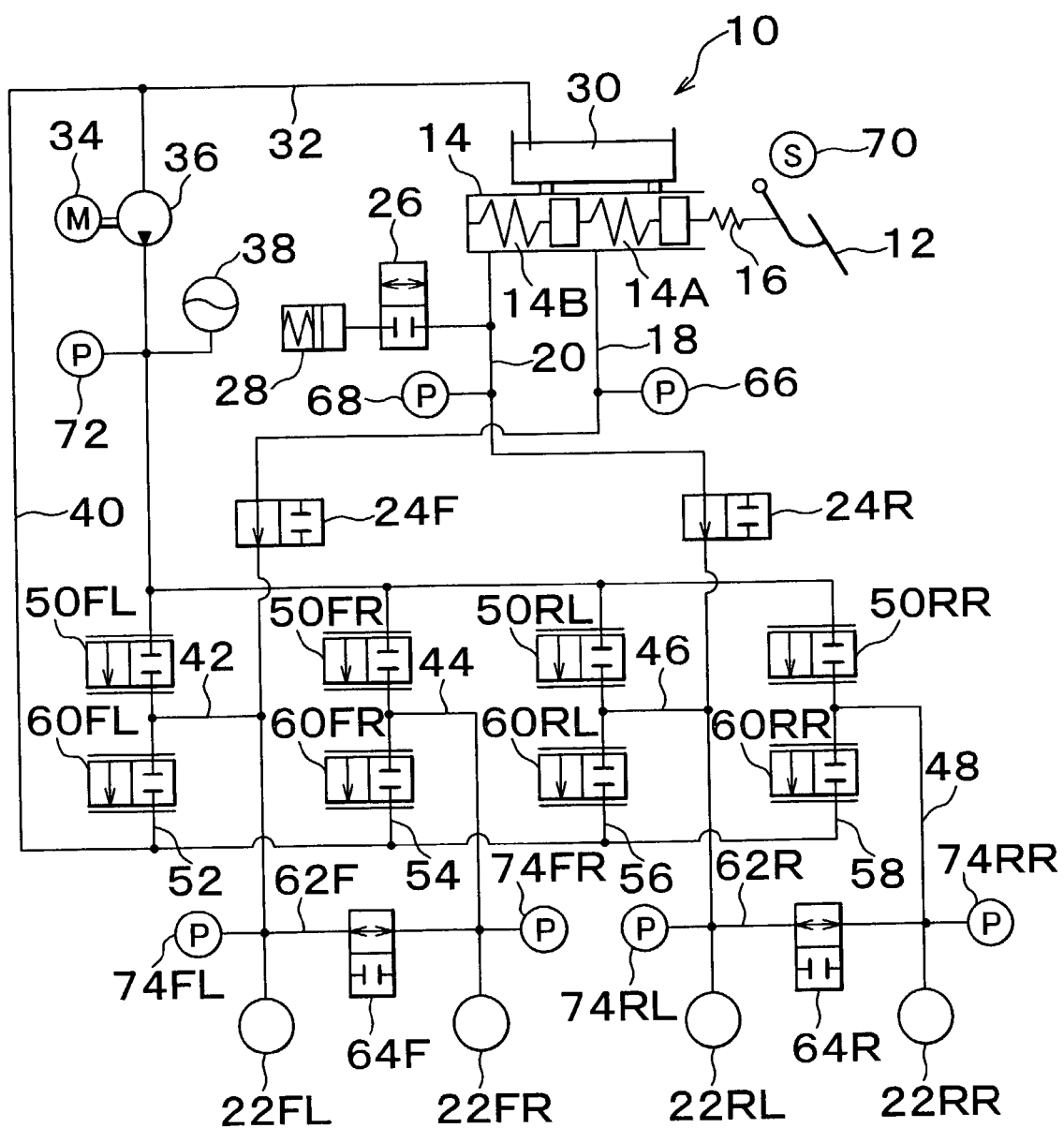
FIG. 1A is a block diagram schematically showing a hydraulic circuit according to a first embodiment of a brake control system for a vehicle according to the invention.
Figure 1B:
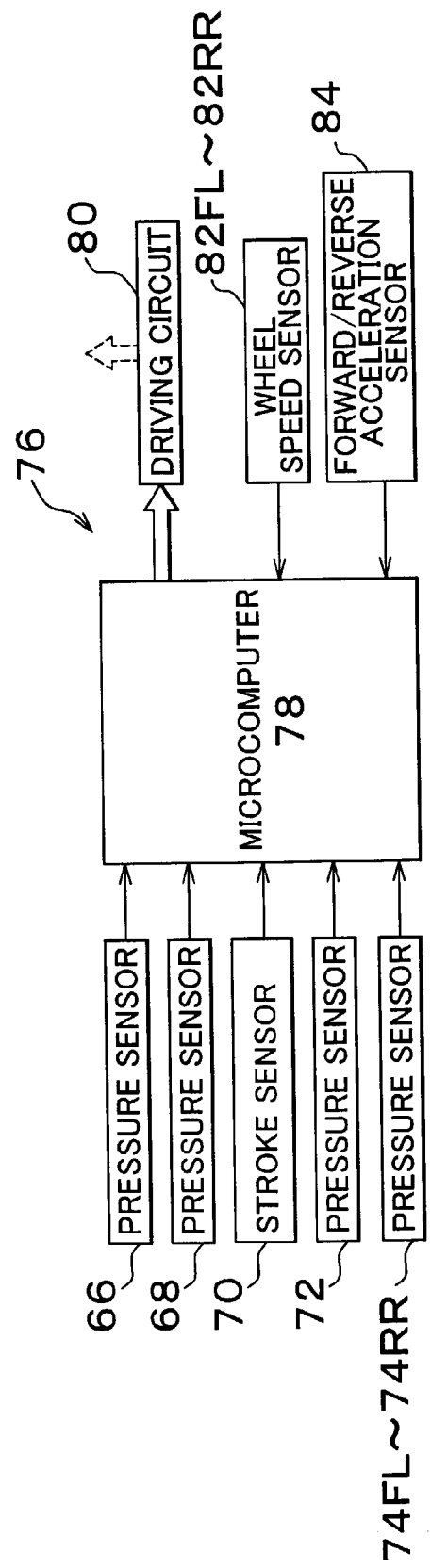
FIG. 1B is an electronic control unit according to a first embodiment of a brake control system for a vehicle according to the invention.

FIGS. 1A and 1B are a block diagram schematically showing a hydraulic circuit and an electronic control unit according to a first exemplary embodiment of a brake control system for a vehicle according to the invention. In FIG. 1A, the solenoids of each of the valves have been omitted for simplification.

Referring to FIG. 1A, an electronically controlled hydraulic brake system 10 has a master cylinder 14 for sending pressurized brake fluid (oil) in response to a depression operation of a brake pedal 12 by a driver. Between the brake pedal 12 and the master cylinder 14 is provided a dry stroke simulator 16.

The master cylinder 14 has a first master cylinder chamber 14A and a second master cylinder chamber 14B. To these chambers are connected one end of a front wheel brake hydraulic supply line 18 and one end of a rear wheel brake hydraulic supply line 20, respectively. The other ends of the brake hydraulic supply lines 18 and 20 are connected to oil cylinders 22FL and 22RL, respectively, which control brake force of the left front wheel and left rear wheel.

Electromagnetic switching valves (master cut-off valves) 24F and 24R are provided in these brake hydraulic supply lines 18 and 20, respectively, and are open during normal operation. The electromagnetic switching valves 24F and 24R function as interrupting devices for controlling communication between the first master cylinder chamber 14A and second master cylinder chamber 14B and their corresponding wheel cylinders, respectively. Further, a wet stroke simulator 28 is connected via an electromagnetic switching valve 26, which is closed during normal operation, to the brake hydraulic supply line 20 between the master cylinder 14 and the electromagnetic switching valve 24R.

Connected to the master cylinder 14 is a reservoir 30. To this reservoir 30 is connected one end of a hydraulic supply line 32. An oil pump 36 driven by an electric motor 34 is provided in the hydraulic supply line 32. An accumulator 38 for accumulating a high hydraulic pressure is connected to the hydraulic supply line 32 on the discharge side of the oil pump 36. One end of a hydraulic discharge line 40 is connected to a portion of the hydraulic supply line 32 between the reservoir 30 and the oil pump 36.

The hydraulic supply line 32 on the discharge side of a portion of the oil pump 36 is connected to a portion of the brake hydraulic supply line 18 between the electromagnetic switching valve 24F and the wheel cylinder 22FL by a hydraulic control line 42, to the wheel cylinder 22FR of the right front wheel via a hydraulic control line 44, to a portion of the brake hydraulic supply line 20 between the electromagnetic switching valve 24F and the wheel cylinder 22RL via a hydraulic control line 46, and to the wheel cylinder 22RR of the right rear wheel via a hydraulic control line 48.

Electromagnetic linear valves 50FL, 50FR, 50RL, 50RR are provided in communication with the hydraulic control lines 42, 44, 46, 48, and are closed during normal operation, the hydraulic control lines 42, 44, 46, 48 on the side of the wheel cylinders 22FL, 22FR, 22RL, 222RR with respect to the linear valves 50FL, 50FR, 50RL, 50RR are connected to the hydraulic release line 40 via hydraulic control lines 52, 54, 56, 58, respectively. Electromagnetic linear valves 60FL, 60FR, 60RL, 60RR are provided in the hydraulic control lines 52, 54, 56, 58, respectively, and are closed during normal operation.

The linear valves 50FL, 50FR, 50RL, 50RR function as increase pressure control valves with respect to the wheel cylinders 22FL, 22FR, 22RL, 22RR, respectively. The linear valves 60FL, 60FR, 60RL, 60RR function as decrease pressure control valves with respect to the wheel cylinders 22FL, 22FR, 22RL, 22RR, respectively. Accordingly, these linear valves work together to comprise increase/decrease pressure control valves for controlling the supply and discharge of high pressure fluid with respect to each wheel cylinder from within the accumulator 38.

The front wheel hydraulic supply line 18 and the right front wheel hydraulic control line 44 are connected together via a connecting line 62F in a location near the corresponding wheel cylinders 22FL and 22FR, respectively. An electromagnetic switching valve 64F provided in the connecting line 62F, and which is closed during normal operation, functions as a communicating control valve for controlling communication between the wheel cylinders 22FL and 22FR.

In the same manner, the rear wheel hydraulic supply line 20 and the right rear wheel hydraulic control line 48 are connected together via a connecting line 62R in a location near the corresponding wheel cylinders 22RL and 22RR, respectively. An electromagnetic switching valve 64R provided in the connecting line 62R, and which is closed during normal operation, functions as a communicating control valve for controlling communication between the wheel cylinders 22RL and 22RR. In this exemplary embodiment, the electromagnetic switching valve 64F and the electromagnetic switching valve 64R are open during normal operation except when anti-skid control such as ABS control is being performed. Accordingly, variation between the respective wheel cylinder pressures of the wheel cylinder 22FL and the wheel cylinder 22FR, as well as variation between the respective wheel cylinder pressures of the wheel cylinder 22RL and the wheel cylinder 22RR, is reduced.

As shown in FIG. 1A, in the brake hydraulic supply line 18 between the first master cylinder chamber 14A and the electromagnetic switching valve 24F is provided a first pressure sensor 66 for detecting a pressure in that supply line as a first master cylinder pressure. Similarly, in the brake hydraulic supply line 20 between the second master cylinder chamber 14B and the electromagnetic switching valve 24R is provided a second pressure sensor 68 for detecting a pressure in that supply line as a second master cylinder pressure. The first and second master cylinder pressures are detected as values corresponding to a braking force applied by the driver to the brake pedal 12.

On the brake pedal 12 is provided a stroke sensor 70 for detecting a depression stroke St as an amount of displacement of the brake pedal 12 by the driver. In the hydraulic supply line 32 on the discharge side of the oil pump 36 is provided a pressure sensor 72 for detecting a pressure within that line as an accumulator pressure Pa.

In the brake hydraulic supply lines 18 and 20 between the electromagnetic switching valves 24F and 24R and the wheel cylinders 22FL and 22RL are provided pressure sensors 74FL and 74RL, respectively, for detecting corresponding pressures in the lines as pressures Pfl and Prl in the wheel cylinder 22FL and 22RL, respectively. Further, in the hydraulic control lines 44 and 48 between the electromagnetic switching valves 50FR and 50RR and the wheel cylinders 22FR and 22RR are provided pressure sensors 74FR and 74RR, respectively, for detecting corresponding pressures in the lines as pressures Pfr and Prr in the wheel cylinders 22FR and 22RR, respectively.

The electromagnetic switching valves 24F and 24R, the electromagnetic switching valve 26, the electric motor 34, the linear valves 50FL, 50FR, 50RL, 50RR, the linear valves 60FL, 60FR, 60RL, 60RR, and the electromagnetic switching valves 64F and 64R are controlled by an electronic control unit 76 as will be described in detail below. The electronic control unit 76 includes a microcomputer 78 and a drive circuit 80.

A driving current is supplied via the drive circuit 80, to each electromagnetic switching valve 24F, 24R, 64F, 64R and 26, each linear valve 50FL, 50FR, 50RL, 50RR, 60FL, 60FR, 60RL, 60RR and the electric motor 34. In particular, during non-control in which the driving current is not being supplied to the electromagnetic switching valves 24F, 24R, 64F, 64R and 26, the linear valves 50FL, 50FR, 50RL, 50RR, 60FL, 60FR, 60RL, 60RR, or the electric motor 34, the electromagnetic switching valves 24F and 24R, and the electromagnetic switching valves 64F and 64R are kept open and the electromagnetic switching valve 26, the linear valves 50FL, 50FR, 50RL, 50RR, and the linear valves 60FL, 60FR, 60RL, 60RR are kept closed (non-control mode).

The microcomputer 78, not shown in detail in FIG. 1B, has, for example, a central processing unit (CPU), read-only memory (ROM), random access memory (RAM), and an input/output port device, and can be of a common configuration in which these are connected together via a bi-directional common bus.

Into the microcomputer 78 are input signals by the pressure sensors 66 and 68 indicative of the first master cylinder pressure and the second master cylinder pressure, respectively, a signal from the stroke sensor 70 indicative of the depression stroke St of the brake pedal 12, a signal from the pressure sensor 72 indicative of the accumulator pressure Pa, and signals from the pressure sensors 74FL through 74RR indicative of the pressure Pi (i=fl, fr, rl, rr) in the wheel cylinders 22FL through 22RR, respectively.

Also input to the microcomputer 78 are signals from wheel speed sensors 82FL through 82RR, indicative of the wheel speed Vwi (i=fl, fr, rl, rr) of the left and right front wheels and the left and right rear wheels, as well as a signal from a forward/reverse acceleration sensor 84 indicative of the forward and reverse acceleration Gx of the vehicle.

Figure 2:
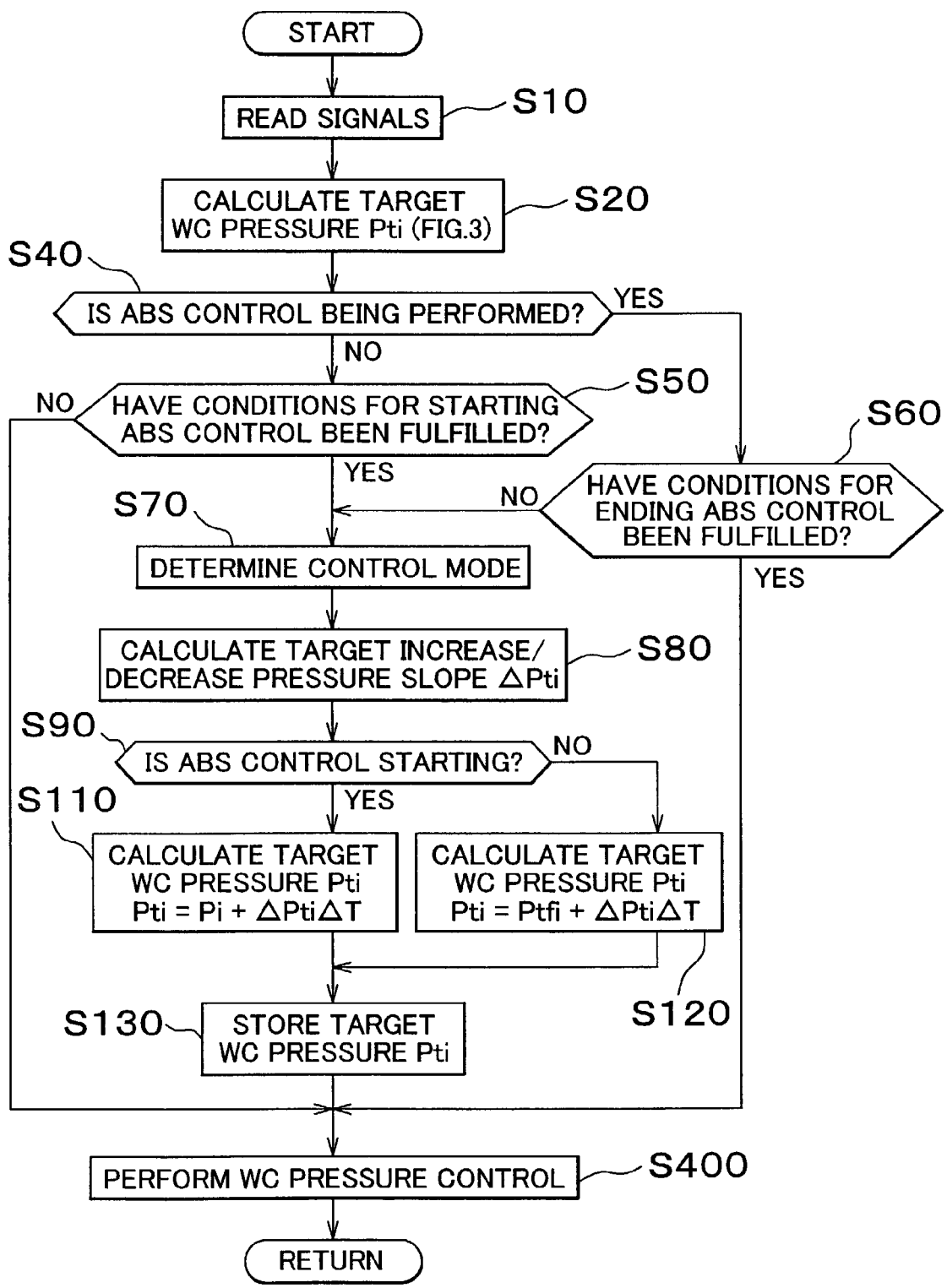
FIG. 2 is a flowchart showing a brake control routine in the first embodiment.
Figure 3:
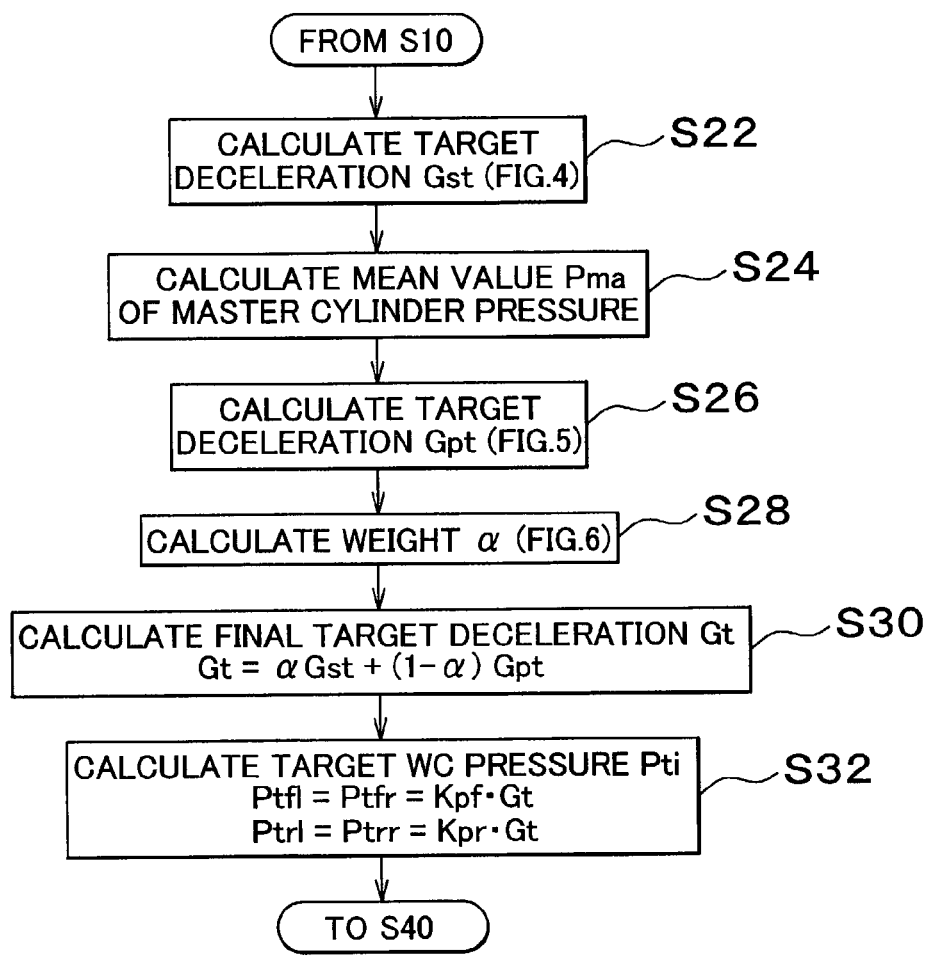
FIG. 3 is a flowchart showing a routine for calculating the target wheel cylinder pressure in the first embodiment.

The microcomputer 78 stores the brake control flow shown in FIGS. 2 and 3, which will be described later. The microcomputer 78 estimates an amount of required braking by the driver based on the master cylinder pressures detected by the pressure sensors 66.and 68 and the depression stroke St detected by the stroke sensor 70, and then calculates a final target deceleration Gt of the vehicle based on the estimated amount of required braking. The microcomputer 78 then calculates a target wheel cylinder pressure (referred to as "target WC pressure" in the figure) Pti (i=fl, fr, rl, rr) of each wheel based on the calculated final target deceleration Gt. The microcomputer 78 then calculates a target driving current for the linear valves 50FL through 50RR or 60FL through 60RR based on the difference between the calculated target wheel cylinder pressure Pti and the actual wheel cylinder pressure Pi. The microcomputer 78 then controls the wheel cylinder pressure of each wheel so that it becomes equal to the target wheel cylinder pressure Pti by sending the driving current to each linear valve based on the calculated target driving current.

In this case, the microcomputer 78 controls the opening amount of the linear valves 50FL, 50FR, 50RL, 50RR according to the target wheel cylinder pressure Pti when the brake control mode is the increase pressure mode to increase the wheel cylinder pressure. Further, the microcomputer 78 controls the opening amount of the linear valves 60FL, 60FR, 60RL, 60RR according to the target wheel cylinder pressure Pti when the brake control mode is the decrease pressure mode to decrease the wheel cylinder pressure. Moreover, the microcomputer 78 keeps the linear valves 50FL through 50RR and 60FL through 60RR closed when the brake control mode is the maintain pressure mode to maintain the wheel cylinder pressure.

Furthermore, the microcomputer 78 estimates a vehicle body speed Vb using a method well known in the technical field based on each wheel speed Vwi, as will be described later, and calculates a brake slip amount as the difference between the estimated vehicle body speed Vb and the wheel speed Vwi for each wheel. The microcomputer 78 then determines whether the conditions for starting anti-skid control have been fulfilled for each wheel based on the calculated brake slip amount and the like, and calculates the target wheel cylinder pressure Pti for the relevant wheel based on a vehicle deceleration, which is based on the forward/backward acceleration Gt of the vehicle, and the brake slip amount SLi when the conditions for starting the anti-skid control (referred to as "ABS control" in the figure) have been fulfilled. The microcomputer 78 then reduces the brake slip amount by performing anti-skid control by controlling the wheel cylinder pressure of each wheel to become equal to the target wheel cylinder pressure Pti.

In particular with the illustrated exemplary embodiment, the microcomputer 78 calculates a target increase/decrease pressure slope ΔPti of the wheel cylinder pressure based on the vehicle deceleration and the brake slip amount such that the target increase/decrease pressure slope ΔPti (i=fl, fr, rl, rr) of the wheel cylinder pressure becomes larger the greater the vehicle deceleration or brake slip amount. The microcomputer 78 takes the most recent target wheel cylinder pressure as Ptfi and the cycle time of the routine shown in FIG. 2 as ΔT, and calculates the target wheel cylinder pressure Pti of the wheel according to equation 1 below when starting anti-skid control, and according to equation 2 below after the start of anti-skid control until the conditions for ending anti-skid control are fulfilled.

$$Pti = Pi + \Delta Pti \Delta T \qquad (1)$$

$$Pti = Ptfi + \Delta Pti \Delta T \qquad (2)$$

Further, the electronic control unit 76 actuates the oil pump 36 by driving the electric motor 34 as necessary based on the accumulator pressure detected by the pressure sensor 72 so as to keep the pressure in the accumulator 38 equal to, or greater than, a preset lower limit value and equal to or less than, a preset upper limit value.

Next, a brake control routine according to the first exemplary embodiment will be described with reference to the flowchart in FIG. 2. The control in the flowchart shown in FIG. 2 is performed repeatedly at predetermined intervals of time, starting with when the ignition switch, not shown, is turned on.

First in Step S10, the signals and the like indicative of the first master cylinder pressure and the second master cylinder pressure detected by the pressure sensors 66 and 68, respectively, are read. In Step S20, the target wheel cylinder pressure Pti of each wheel is calculated according to the flowchart shown in FIG. 3. Although not shown in FIG. 2, when starting ABS control, the electromagnetic switching valve 26F is opened while the electromagnetic switching valves 24F, 24R, 64F, 64R are kept closed, such tat the oil pump 36 starts to be driven by the electric motor 34.

Steps S40 through S130 are performed in chronological order for each wheel in, for example, the order of the left front wheel, the right front wheel, the left rear wheel, and the right rear wheel. In Step S40 it is determined whether anti-skid control is being performed. If the determination is YES, the routine proceeds to Step S60. If the determination is NO, the routine proceeds to Step S50.

In Step S50, the brake slip amount of each wheel is calculated based on the estimated vehicle body acceleration Vb and the wheel acceleration Vwi, and it is determined whether the conditions for starting anti-skid control have been satisfied based on the estimated vehicle acceleration Vb and the brake slip amount. For example, it is determined whether the estimated vehicle body acceleration Vb is equal to, or greater then, a control start threshold level Vbs (a positive numerical constant) and whether the brake slip amount of the wheel is equal to, or greater than, a threshold level (a positive numerical constant, not shown). If the determination in Step S50 is NO, the routine proceeds to Step S400. If the determination in Step S50 is YES, the electromagnetic switching valves 64F and/or 64R, which function as communication control valves, are kept closed and the routine proceeds to Step S70.

In Step S60, it is determined whether the conditions for ending anti-skid control have been fulfilled. If the determination in Step S60 is YES, the electromagnetic switching valves 64F and/or 64R, which function as communication control valves, are kept closed and routine proceeds to Step S400. If the determination in Step S60 is NO, the routine proceeds to Step S70. In Step S70, a brake control mode is selected from among the increase pressure mode, the maintain pressure mode, and the decrease pressure mode by a method well known in the technical field, based on wheel acceleration, for example, a time derivative value of a wheel speed Vwi, and the brake slip amount SLi of the wheel.

In Step S60, the conditions for ending anti-skid control can be determined to be fulfilled when at least one of the following conditions have been fulfilled: (1) braking by the driver or braking with an automatic brake control system has ended; (2) the estimated vehicle body acceleration Vb is equal to, or less than, a control end threshold level Vbf (a positive numerical constant).

In Step S80, the target increase/decrease pressure slope ΔPti of the wheel cylinder pressure is calculated based on the brake control mode, the vehicle deceleration, and the brake slip amount of the wheel using a map, not shown. In this case, when the brake control mode is the increase pressure mode, the target increase/decrease pressure slope ΔPti is calculated to a larger positive value the larger the vehicle deceleration or brake slip amount of the wheel. When the brake control mode is the decrease pressure mode, the target increase/decrease pressure slope ΔPti is calculated to a larger negative value the larger the vehicle deceleration or brake slip amount of the wheel. When the brake control mode is the maintain pressure mode, the target increase/decrease pressure slope ΔPti is set to 0.

In Step S90 it is determined whether anti-skid control is starting. If the determination in Step S90 is YES, then the routine proceeds to Step S110, where the target wheel cylinder pressure Pti is calculated according to the aforementioned equation 1. If the determination in Step S90 is NO, i.e., if it is determined that anti-skid control is already being performed, the routine proceeds to Step S120, where the target wheel cylinder pressure Pti is calculated according to the aforementioned equation 2.

In Step S130, the target wheel cylinder pressure Pti calculated in Step S110 or Step S120 is stored in memory such as RAM. In Step S400, the linear valves 50FL through 50RR or 60FL through 60RR are controlled such that the wheel cylinder pressure Pi becomes equal to the target wheel cylinder pressure Pti, after which the routine returns to Step S10.

Next, a routine for calculating the target wheel cylinder pressure according to the illustrated exemplary embodiment will be described with reference to the flowchart shown in FIG. 3.

Figure 4:
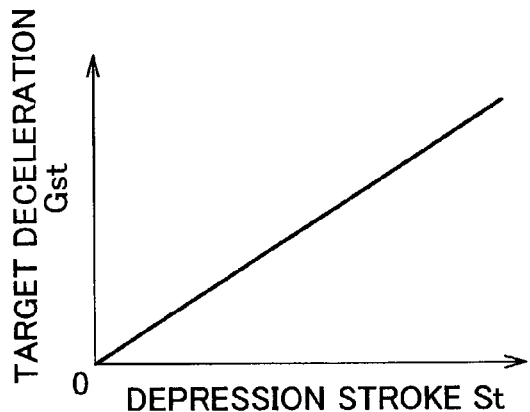
FIG. 4 is a graph showing a relationship between a depression stroke St of a brake pedal and a target deceleration Gst.
Figure 5:
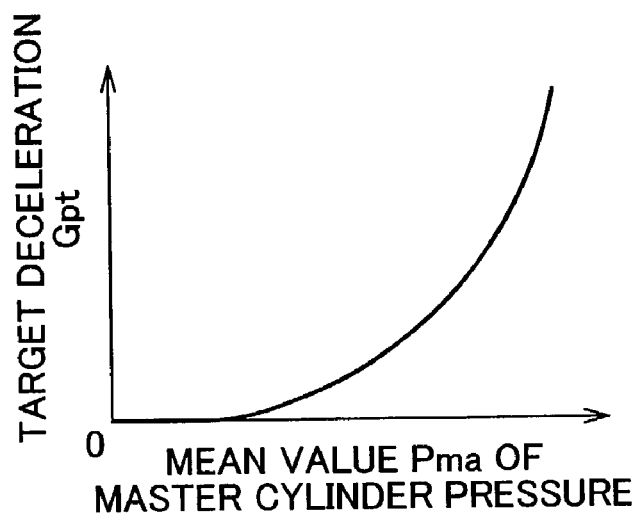
FIG. 5 is a graph showing a relationship between a mean value Pm of a master cylinder pressure and the target deceleration Gpt.

In Step S22, the target deceleration Gst is calculated based on the depression stroke St detected by the stroke sensor 70 using a map corresponding to the graph shown in FIG. 4. In Step S24, a mean value Pma of the first master cylinder pressure and second cylinder pressure is calculated. In Step S26, a target deceleration Gpt which is based on the master cylinder pressure is calculated based on this mean value Pma using a map corresponding to the graph shown in FIG. 5.

Figure 6:
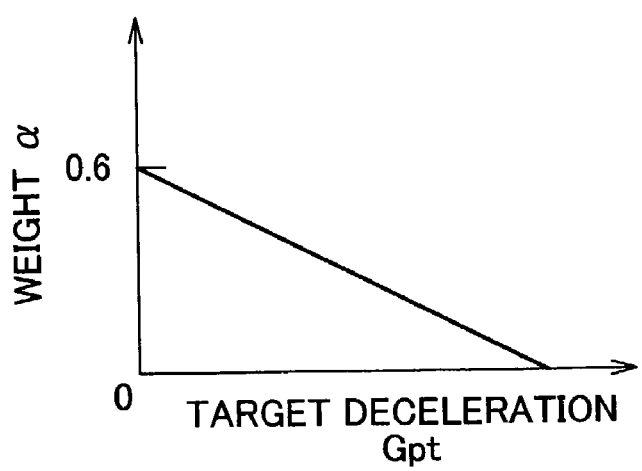
FIG. 6 is a graph showing a relationship between the most recently calculated final target deceleration Gt and a weight α applied to the target deceleration Gpt.

In Step S28, a weight α(0≦α≦0.6) to be applied to the target deceleration Gst is calculated based on the target deceleration Gpt using a map corresponding to a graph shown in FIG. 6. In Step S30, the final target deceleration Gt is calculated as the weighted sum of the target deceleration Gpt and the target deceleration Gst according to equation 3 below. In the illustrated exemplary embodiment, the weight α is set in a range in which 0≦α≦0.6 is fulfilled. However, the highest value is not limited to 0.6, but can be any value from 0 to 1 inclusive.

$$Gt=\alpha Gst+(1-\alpha)Gpt \quad (3)$$

In Step S32, the coefficients of the target wheel cylinder pressures of the left and right front wheels and the left and right rear wheels with respect to the final target deceleration Gt are Kpf and Kpr, respectively. The target wheel cylinder pressure Pti (i= fl, fr, rl, rr) of each wheel are calculated based on the final target deceleration Gt according to equations 4 and 5 below, after which the routine returns to Step S40.

$$Ptfl=Ptfr=Kpf\cdot Gt \quad (4)$$

$$Ptrl=Ptrr=Kpr\cdot Gt \quad (5)$$

Therefore, according to the illustrated exemplary embodiment, first in Step S20, the target wheel cylinder pressure Pti of each wheel is calculated based on the braking amount by the driver. Then in Step S70, a brake control mode is selected from among the increase pressure mode, the decrease pressure mode, and the maintain pressure mode when the determination in Step S50 is YES when the conditions for starting anti-skid control have been fulfilled, or when the determination in Step S40 is YES when anti-skid control is being performed but the determination in Step S60 is NO.

Then, in Step S80, the target increase/decrease pressure slope ΔPti is calculated based on the brake control mode, the vehicle deceleration Gxb, and the brake slip amount SLi of the wheel. Then, when anti-skid control is starting, the determination in Step S90 is YES and the routine proceeds to Step S110, where the target wheel cylinder pressure Pti is calculated based on the calculated target increase/decrease pressure slope ΔPti according to the aforementioned equation 1. After anti-skid control has started, the determination in Step S90 is NO and the routine proceeds to Step S120, where the target wheel cylinder pressure Pti is calculated based on the calculated target increase/decrease pressure slope ΔPti according to the aforementioned equation 2. In Step S400, the wheel cylinder pressure Pi of the wheel is controlled so as to become equal to the target wheel cylinder pressure Pti calculated in Step S110 or Step S120.

Therefore, according to the first exemplary embodiment, when starting anti-skid control as the predetermined brake control operation, the target wheel cylinder pressure Pti is always calculated based on the actual wheel cylinder pressure Pi. Then, because the following target wheel cylinder pressure Pti is calculated based on the most recent target wheel cylinder pressure Ptfi, it is possible to set the target wheel cylinder pressure Pti when starting anti-skid control to a proper value in accordance with the slip state of the wheel that is always less than the actual wheel cylinder pressure Pi. Accordingly, a pressure decrease when starting anti-skid control can be appropriately performed without a delay, and the following target wheel cylinder pressure Pti can be set to an appropriate value according to the slip state of the wheel. As a result, the actual wheel cylinder pressure Pi is able to be appropriately and precisely controlled in accordance with the slip state of the wheel, such that anti-skid control can be performed appropriately and effectively.

Figure 7:
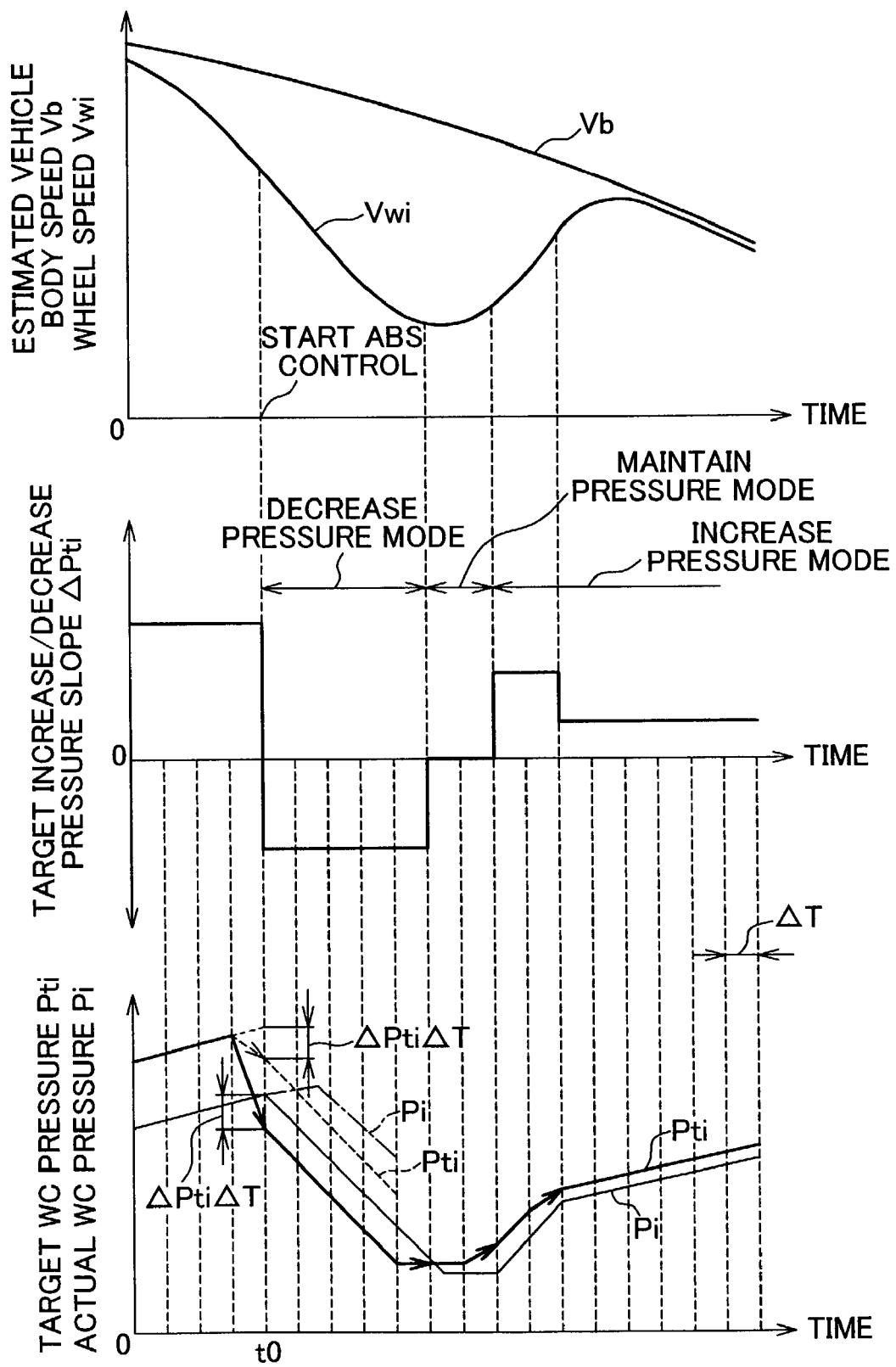
FIG. 7 is an explanatory view showing a comparison between an example of a change in the target wheel cylinder pressure Pti and actual wheel cylinder pressure Pi during anti-skid control and a comparative example.

FIG. 7 is an explanatory view showing a comparison between an example of a change in the target wheel cylinder pressure Pti and actual wheel cylinder pressure Pi during anti-skid control and a comparative example.

The estimated vehicle body speed Vb and the wheel speed Vwi change as shown in the top part of FIG. 7. Assuming that anti-skid control starts at time t0 and the target increase/decrease pressure slope ΔPti changes as shown in the middle part of FIG. 7, even when starting anti-skid control, in a comparative example in which the target wheel cylinder pressure Pti is calculated according to equation 2, the target wheel cylinder pressure Pti changes as shown by the dotted line in the bottom part of FIG. 7, such that the target wheel cylinder pressure Pti at time to becomes greater than the actual wheel cylinder pressure Pi. Therefore, the decrease in the wheel cylinder pressure starts later than at time t0. As a result, the slip state of the wheel is not able to be effectively controlled without a delay.

On the other hand, according to the illustrated exemplary embodiment, the target wheel cylinder pressure Pti at time t0 is calculated to be less than the actual wheel cylinder pressure Pi by $\Delta Pti \cdot \Delta T$. As a result, the wheel cylinder pressure from the start of anti-skid control can be decreased by the appropriate decrease pressure slope according to the slip state of the wheels such that the slip state of the wheels can be effectively controlled without a delay.

Figure 8:
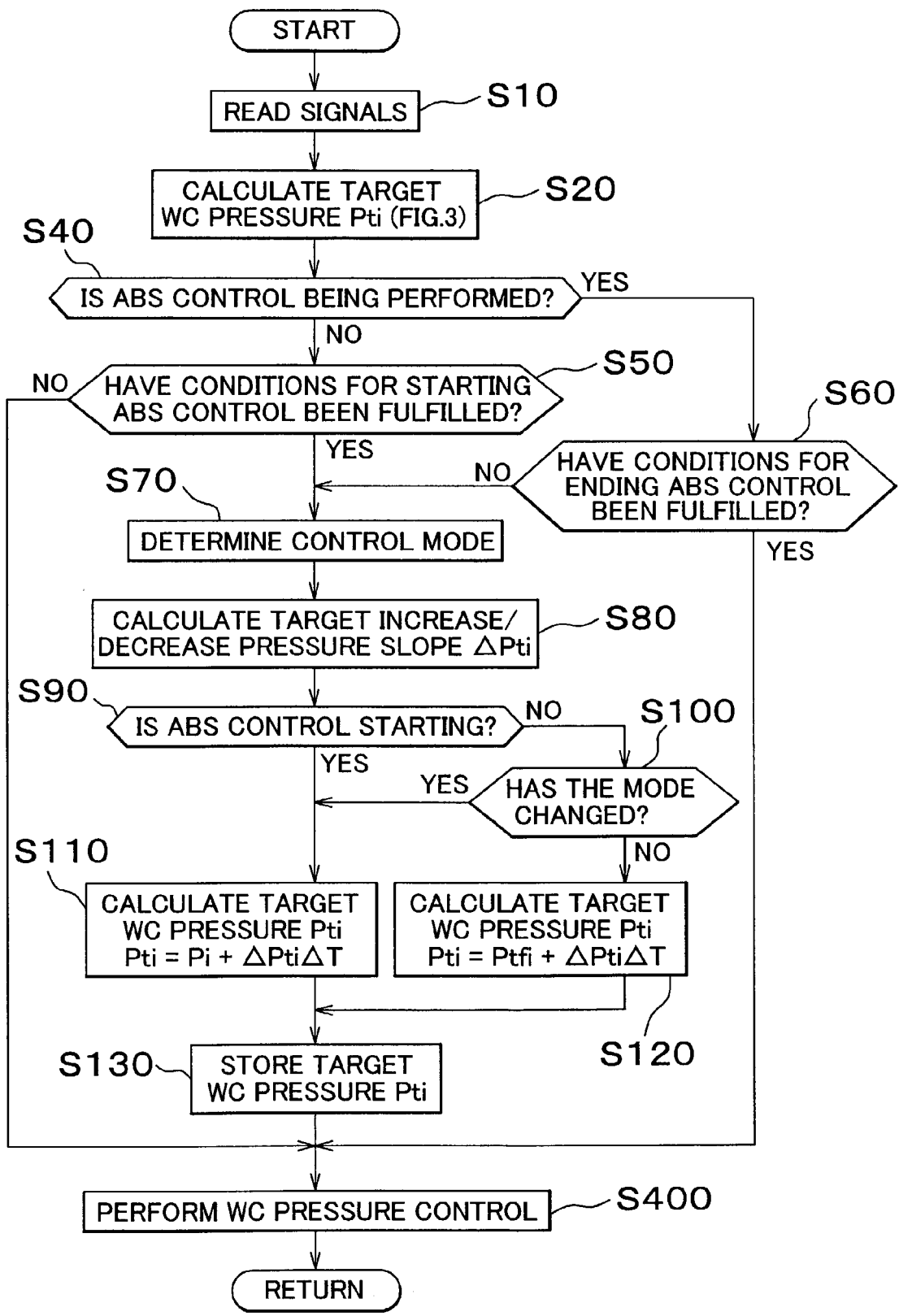
FIG. 8 is a flowchart showing a brake control routine according to a second embodiment of the brake control system for a vehicle according to the invention.

FIG. 8 is a flowchart showing a brake control routine according to a second exemplary embodiment of the brake control system for a vehicle according to the invention. The control according to the flowchart shown in FIG. 4 is also performed repeatedly at predetermined intervals of time, starting with when the ignition switch, not shown, is turned on. Further, steps in FIG. 8 which correspond to like steps in FIG. 2 are numbered with the same step numbers as their corresponding steps in FIG. 2. The same will apply to the other exemplary embodiments described hereinafter.

According to this second exemplary embodiment, if the determination in Step S90 is NO, i.e., if it is determined that anti-skid control is being performed, then the routine proceeds to Step S100, where it is determined whether the brake control mode has been changed, such as from the decrease pressure mode to the increase pressure mode. If the determination in Step S100 is YES, the routine proceeds to Step S110. If the determination in Step S100 is NO, the routine proceeds to Step S120.

Therefore, according to the second exemplary embodiment, when the brake control mode changes when anti-skid control is being performed, the target wheel cylinder pressure Pti is always calculated based on the actual wheel cylinder pressure Pi. Therefore, even when the brake control mode changes, the target wheel cylinder pressure Pti can be set appropriately in accordance with the slip state of the wheel, as compared to when the target wheel cylinder pressure Pti is calculated based on the most recent target wheel cylinder pressure Ptfi. As a result, the wheel cylinder pressure is able to be controlled appropriately and without a delay in accordance with the slip state of the wheel.

Figure 9A:
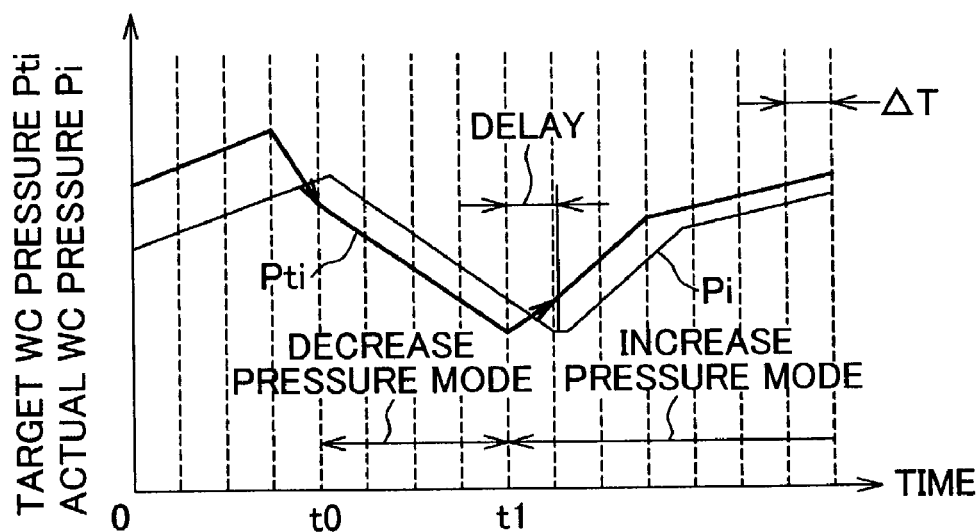
FIG. 9A is an explanatory view showing an example of a change in the target wheel cylinder pressure Pti and actual wheel cylinder pressure Pi when the brake control mode is changed from a decrease pressure mode to an increase pressure mode with the first embodiment.
Figure 9B:
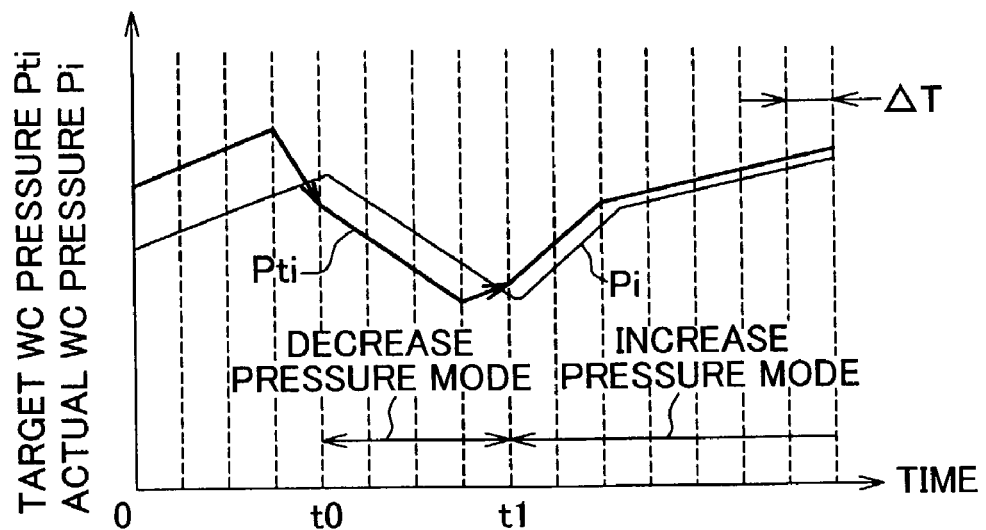
FIG. 9B is an explanatory view showing an example of a change in the target wheel cylinder pressure Pti and actual wheel cylinder pressure Pi when the brake control mode is changed from a decrease pressure mode to an increase pressure mode with the second embodiment.

For example, FIGS. 9A and 9B are an explanatory views showing examples of a change in the target wheel cylinder pressure Pti and actual wheel cylinder pressure Pi when the brake control mode is changed from the decrease pressure mode to the increase pressure mode at time t1. FIG. 9A is an explanatory view showing an example in the case of the first exemplary embodiment, and FIG. 9B is an explanatory view showing an example in the case of the second exemplary embodiment.

In a situation in which the brake control mode changes from the decrease pressure mode to the increase pressure mode, with the first exemplary embodiment above, the target wheel cylinder pressure Pti of the next cycle after time t1 is calculated based on the target wheel cylinder pressure Pti at time t1. As a result, there may be a comparatively long delay in the shift of the wheel cylinder pressure Pi from a pressure decrease to a pressure increase.

On the other hand, according to the second exemplary embodiment, the target wheel cylinder pressure Pti of the next cycle after time t1 is calculated based on the actual wheel cylinder pressure Pi at time t1. As a result, the delay in the shift of the actual wheel cylinder pressure Pi from a pressure decrease to a pressure increase is reliably reduced, which enables the wheel cylinder pressure to be appropriately controlled in accordance with the slip state of the wheel. Although not illustrated, in a situation in which the brake control mode changes from the increase pressure mode to the decrease pressure mode as well, the delay in the shift of the actual wheel cylinder pressure Pi from a pressure increase to a pressure decrease is able to be reliably reduced.

Figure 10A:
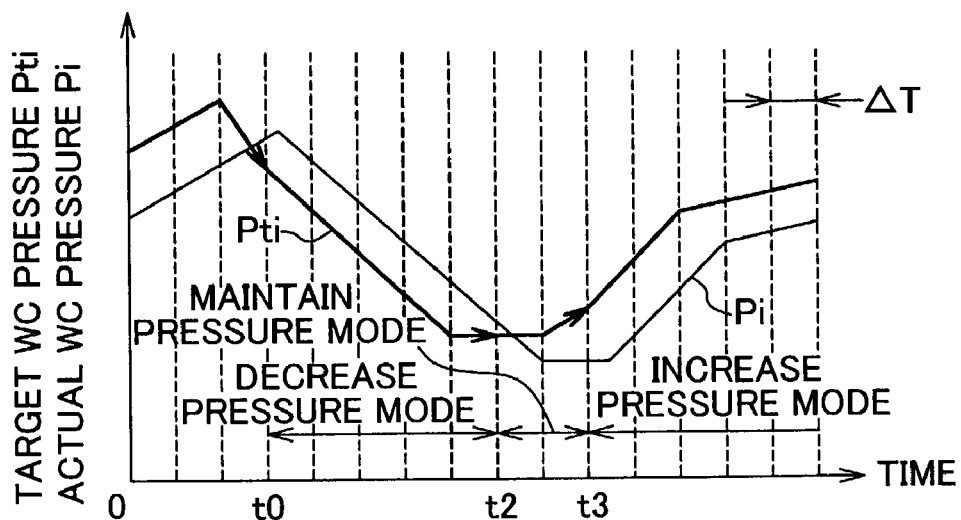
FIG. 10A is an explanatory view showing an example of a change in the target wheel cylinder pressure Pti and actual wheel cylinder pressure Pi when the brake control mode is changed from a decrease pressure mode to a maintain pressure mode with the first embodiment.
Figure 10B:
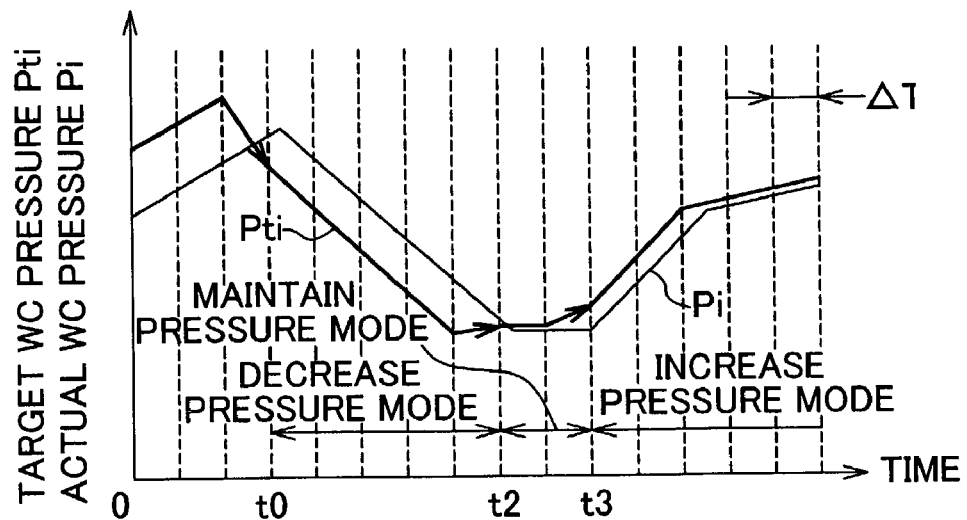
FIG. 10B is an explanatory view showing an example of a change in the target wheel cylinder pressure Pti and actual wheel cylinder pressure Pi when the brake control mode is changed from a decrease pressure mode to a maintain pressure mode with the second embodiment.

FIGS. 10A and 10B are explanatory views showing an example of a change in the target wheel cylinder pressure Pti and actual wheel cylinder pressure Pi when the brake control mode is changed from the decrease pressure mode to the maintain pressure mode at time t2, and when the brake mode is changed from the maintain pressure mode to the increase pressure mode at time t3. FIG. 10A is an explanatory view showing an example with the first exemplary embodiment, and FIG. 10B is an explanatory view showing an example with the second exemplary embodiment.

In the foregoing first exemplary embodiment, in a situation in which the brake control mode is changed from the decrease pressure mode to the maintain pressure mode, the target wheel cylinder pressure Pti of the next cycle after time t2 is set to the target wheel cylinder pressure Pti at time t2. In a situation in which the brake control mode is changed from the maintain pressure mode to the increase pressure mode, the target wheel cylinder pressure Pti of the next cycle after time t3 is calculated based on the target wheel cylinder pressure Pti at time t3. As a result, there may be a comparatively long delay in the shift of the wheel cylinder pressure Pi from a pressure decrease to when the pressure is maintained and from when the pressure is maintained to a pressure increase.

On the other hand, according to the second exemplary embodiment, the target wheel cylinder pressure Pti of the next cycle after time t2 is set to the actual wheel cylinder pressure Pi at time t2, and the target wheel cylinder pressure Pti of the next cycle after time t3 is calculated based on the actual wheel cylinder pressure Pi at time t3. As a result, the delay in the shift of the actual wheel cylinder pressure Pi from a pressure decrease to maintaining pressure, as well as the delay in the shift of the actual wheel cylinder pressure Pi from maintaining pressure to a pressure increase, is able to be reliably reduced.

Figure 11:
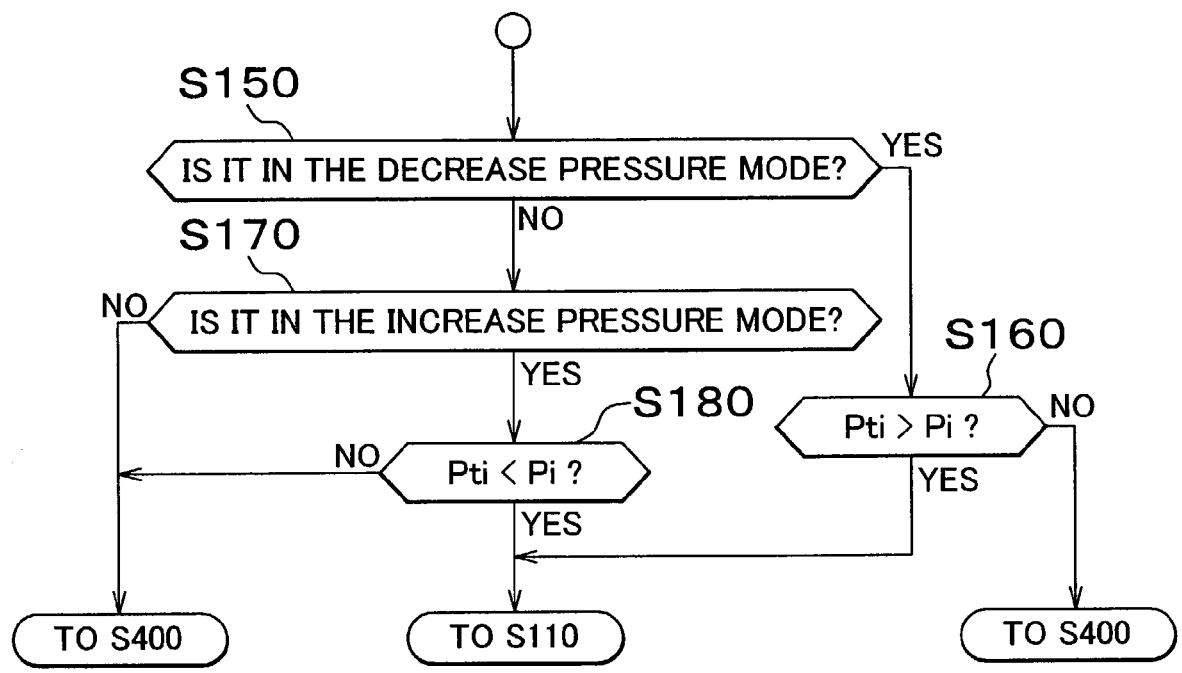
FIG. 11 is a flowchart showing a main part of the brake control routine according to a third embodiment of the brake control system for a vehicle according to the invention.

FIG. 11 is a flowchart showing a main part of the brake control routine according to a third exemplary embodiment of the brake control system for a vehicle according to the invention. The control according to the flowchart shown in FIG. 11 is performed when the determination in Step S50 in FIG. 2 or FIG. 8 is NO, or when the determination in Step S60 is YES.

According to the third exemplary embodiment, it is determined in Step S150 whether the brake control mode is the decrease pressure mode. When the determination is NO, the routine proceeds to Step S170. When the determination is YES, the routine proceeds to Step S160. In Step S160, it is determined whether the target wheel cylinder pressure Pti has exceeded the actual wheel cylinder pressure Pi. When the determination is NO, the routine proceeds directly to Step S400. When the determination is YES, the routine proceeds to Step S110.

In Step S170, it is determined whether the brake control mode is the increase pressure mode. If the determination is NO, the routine proceeds directly to Step S400. If the determination is YES, the routine proceeds to Step S180. In Step S180, it is determined whether the target wheel cylinder pressure Pti is less than the actual wheel cylinder pressure Pi. If the determination is NO, then the routine proceeds directly to Step S400. If the determination is YES, then the routine proceeds to Step S110.

Therefore, according to the third exemplary embodiment, when the target wheel cylinder pressure Pti exceeds the actual wheel cylinder pressure Pi when the brake control mode is the decrease pressure mode, i.e., when the actual wheel cylinder pressure Pi has undershot the target wheel cylinder pressure Pti (overshooting of decrease pressure), the target wheel cylinder pressure Pti is always calculated based on the actual wheel cylinder pressure Pi because the determinations in Steps S150 and S160 are YES. As a result, the wheel cylinder pressure is able to be reliably prevented from increasing unnecessarily.

Further, when the target wheel cylinder pressure Pti is less than the actual wheel cylinder pressure Pi when the brake control mode is the increase pressure control mode, i.e., when the actual wheel cylinder pressure overshoots the target wheel cylinder pressure Pti, the target wheel cylinder pressure Pti is always calculated based on the actual wheel cylinder pressure Pi because the determinations in Steps S170 and S180 are YES. As a result, the wheel cylinder pressure is able to be reliably prevented from decreasing unnecessarily.

Figure 12:
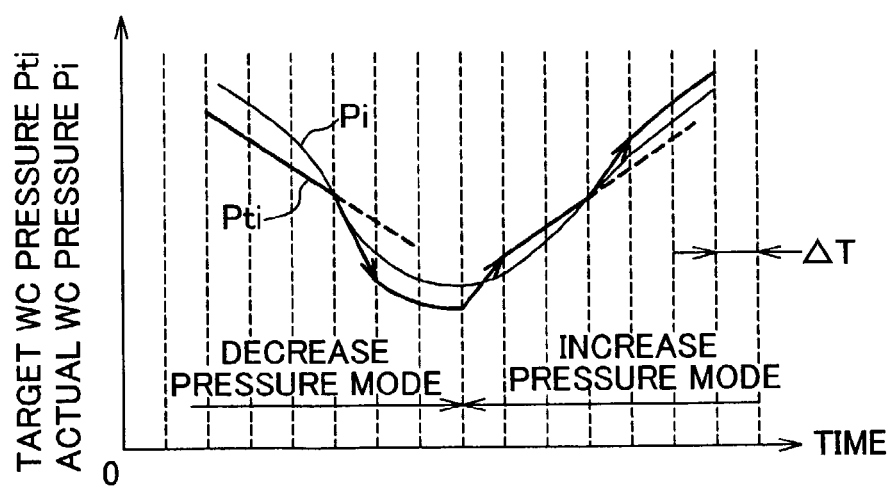
FIG. 12 is an explanatory view showing an example of when the actual wheel cylinder pressure Pi undershoots the target wheel cylinder pressure Pti in the decrease pressure mode, and an example of when the actual wheel cylinder pressure Pi overshoots the target wheel cylinder pressure Pti in the increase pressure mode.

FIG. 12 is an explanatory view showing an example of when the actual wheel cylinder pressure Pi undershoots the target wheel cylinder pressure Pti in the decrease pressure mode, and an example of when the actual wheel cylinder pressure Pi overshoots the target wheel cylinder pressure Pti in the increase pressure mode. The dotted line in FIG. 12 shows the change in the target wheel cylinder pressure Pti in the case of the first exemplary embodiment described above.

As shown in FIG. 12, with the first exemplary embodiment, when the actual wheel cylinder pressure Pi undershoots the target wheel cylinder pressure Pti in the decrease pressure mode, the target wheel cylinder pressure Pti becomes greater than the actual wheel cylinder pressure Pi such that the wheel cylinder pressure is increased or the degree of decrease is reduced. Moreover, when the actual wheel cylinder pressure Pi overshoots the target wheel cylinder pressure Pti in the increase mode, the target wheel cylinder pressure Pti becomes less than the actual wheel cylinder pressure Pi such that the wheel cylinder pressure is reduced or the degree of increase is reduced.

In contrast, according to the illustrated third exemplary embodiment, when the actual wheel cylinder pressure Pi undershoots the target wheel cylinder pressure Pti in the decrease pressure mode, the target wheel cylinder pressure Pti is corrected so as to become less than the actual wheel cylinder pressure Pi. As a result, it is possible to reliably prevent the wheel cylinder pressure from increasing or the degree of decrease from being reduced. Moreover, when the actual wheel cylinder pressure Pi overshoots the target wheel cylinder pressure Pti in the increase mode, the target wheel cylinder pressure Pti is corrected so as to become higher than the actual wheel cylinder pressure Pi. As a result, it is possible to reliably prevent the wheel cylinder pressure from decreasing or the degree of increase from being reduced.

Figure 13:
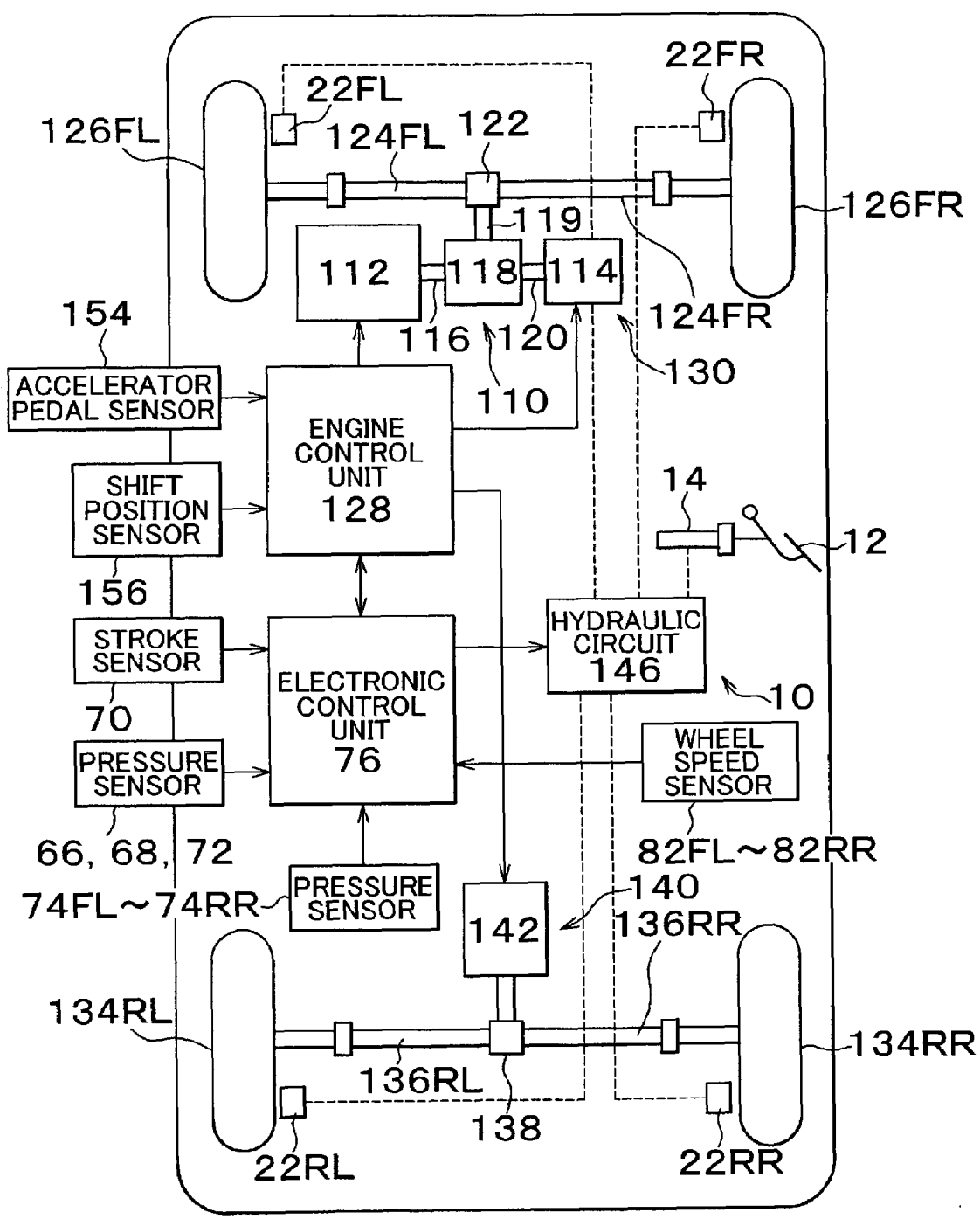
FIG. 13 is a block diagram schematically showing a fourth exemplary embodiment of the brake control system according to the invention applied to a front wheel drive vehicle with a hybrid engine and which has both a regenerative braking system and a friction braking system for the front as well as rear wheels.

FIG. 13 is a block diagram schematically showing a fourth exemplary embodiment of the brake control system according to the invention applied to a front wheel drive vehicle with a hybrid engine and which has both a regenerative braking system and a friction braking system for the front as well as rear wheels. Further, elements in FIG. 13 which are similar to elements shown in FIG. 1 are denoted by the same reference numerals as their corresponding elements in FIG. 1.

In FIG. 13, a hybrid engine 110 for driving the front wheels includes a gasoline engine 112 and an electric generator 114. An output shaft 116 of the gasoline engine 112 is coupled to an input shaft of a continuously variable transmission 118 which houses a clutch. The input shaft of the continuously variable transmission is coupled to an output shaft 120 of the electric generator 114. Rotation of the output shaft 119 of the continuously variable transmission 118 is transmitted to left and right front axles 124FL and 124FR via a front differential 122. As a result, the left and right front wheels 126FL and 126FR are driven so as to rotate.

The gasoline engine 112 and electric generator 114 of the hybrid engine 110 are controlled by an engine control unit 128 according to a depression amount of an accelerator 12 by the driver and the driving conditions of the vehicle. Also, the electric generator 114 functions as a generator for a front wheel regenerative braking system 130, as well as a regenerative generator (for regenerative braking), and is controlled by the engine control unit 128.

In particular, according to the illustrated exemplary embodiment, the hybrid engine 110 generates a driving force or a braking force by the gasoline engine 112 or a combination of the gasoline engine 112 and the electric generator 114 during normal driving when the shift lever, not shown, is in the (normal driving mode). Further, the hybrid engine 110 generates driving force by only the electric generator 114 when the shift lever is in the normal driving mode but the load is low (electric vehicle mode). Further, the hybrid engine 110 generates driving force or engine braking force with both the gasoline engine 112 and the electric generator 114 when the shift lever is in the dual driving mode. The engine braking force in this case, however, is greater than when the shift lever is in the normal driving mode (engine brake mode). The electric generator 114 also functions as a regenerative generator when the shift lever is in the normal driving mode and the brake pedal 12 is depressed by the driver.

Moreover, in FIG. 13, rotation of the left and right rear wheels 134RL and 134RR, which are the driven wheels, is transmitted to the electric generator 142 of a rear wheel regenerative braking system 140 via left and right rear wheel axles 136RL and 136RR and a rear wheel differential 138. Regenerative braking by the electric generator 142 is also controlled by the engine control unit 128, such that the engine control unit 128 functions as a control unit for the regenerative braking system.

Friction braking force of the left and right front wheels 126FL and 126FR and the left and right rear wheels 134RL and 134RR is controlled by controlling the pressure of the corresponding wheel cylinders 22FL, 22FR, 22RL, 22RR with a hydraulic circuit 146 of the brake system 10. Although not shown, the hydraulic circuit 146 includes a reservoir, oil pump and various valve devices and the like. The pressure of each wheel cylinder is controlled by an electronic control unit 76, which serves as a control unit for the friction braking system that controls the pressure of each of the wheel cylinders 22FL, 22FR, 22RL and 22RR according to the depression amount of the brake pedal 12 by the driver and the pressure of the master cylinder 14 which is driven in accordance with the depression of the brake pedal 12 during normal operation.

Into the engine control unit 128 are input a signal from an accelerator pedal sensor 154 indicative of the depression amount of the accelerator pedal, a signal from a shift position sensor 156 indicative of a shift position of the continuously variable transmission 118, and signals from the electronic control unit 76 indicative of a front wheel target regenerative braking force Frgft and a rear wheel target regenerative braking force Frgrt, respectively. Input to the electronic control unit 76 are various other signals such as a signal from the stroke sensor 70 indicative of the depression stroke St of the brake pedal 12.

Just like the electronic control unit 76, the engine control unit 128 can, in actuality, also be of a general configuration which includes, for example, a microcomputer including a CPU, ROM, RAM, and an input/output device, and a drive circuit, respectively.

Figure 14:
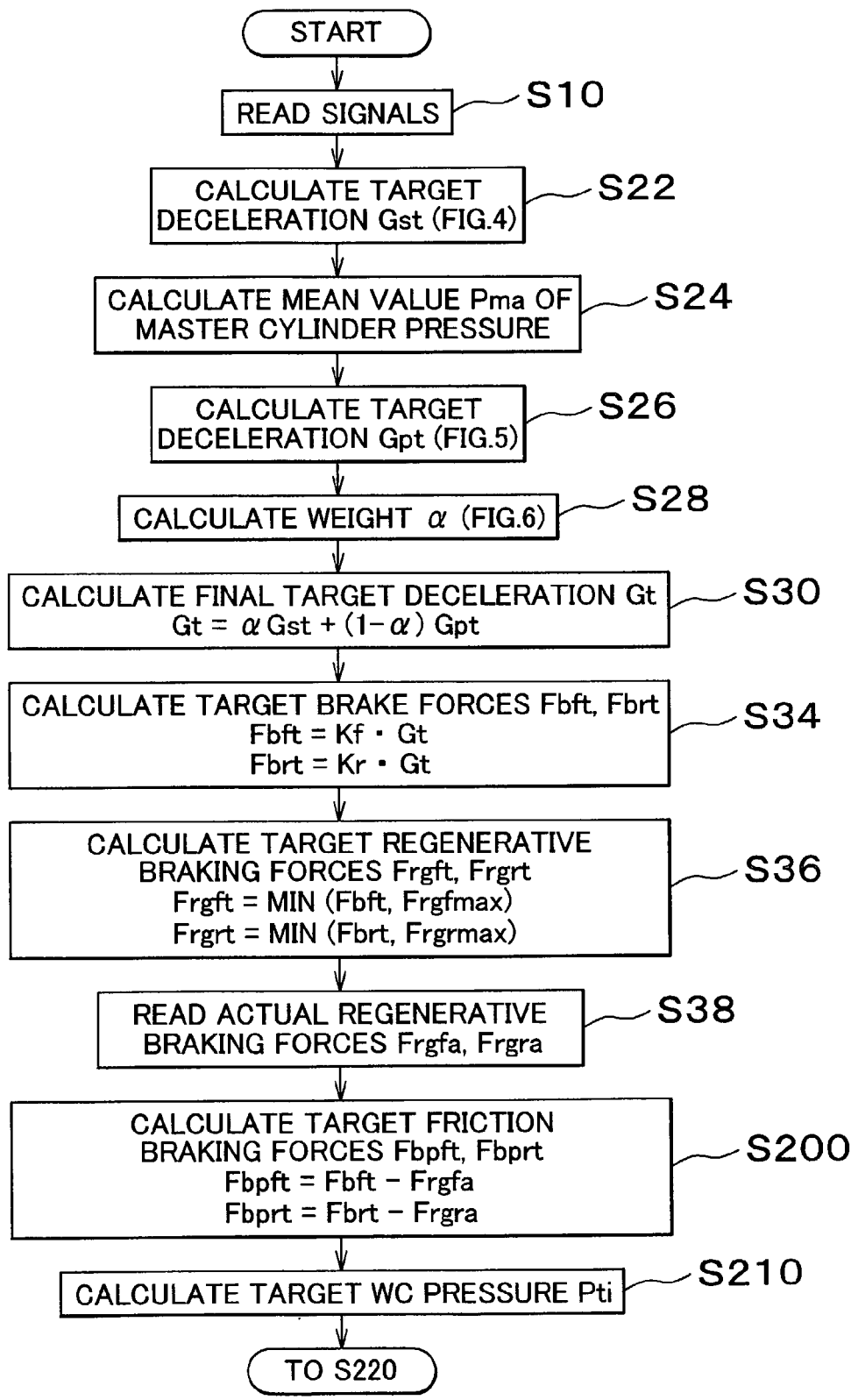
FIG. 14 is a flowchart showing a first half of a brake control routine in a fourth embodiment.
Figure 15:
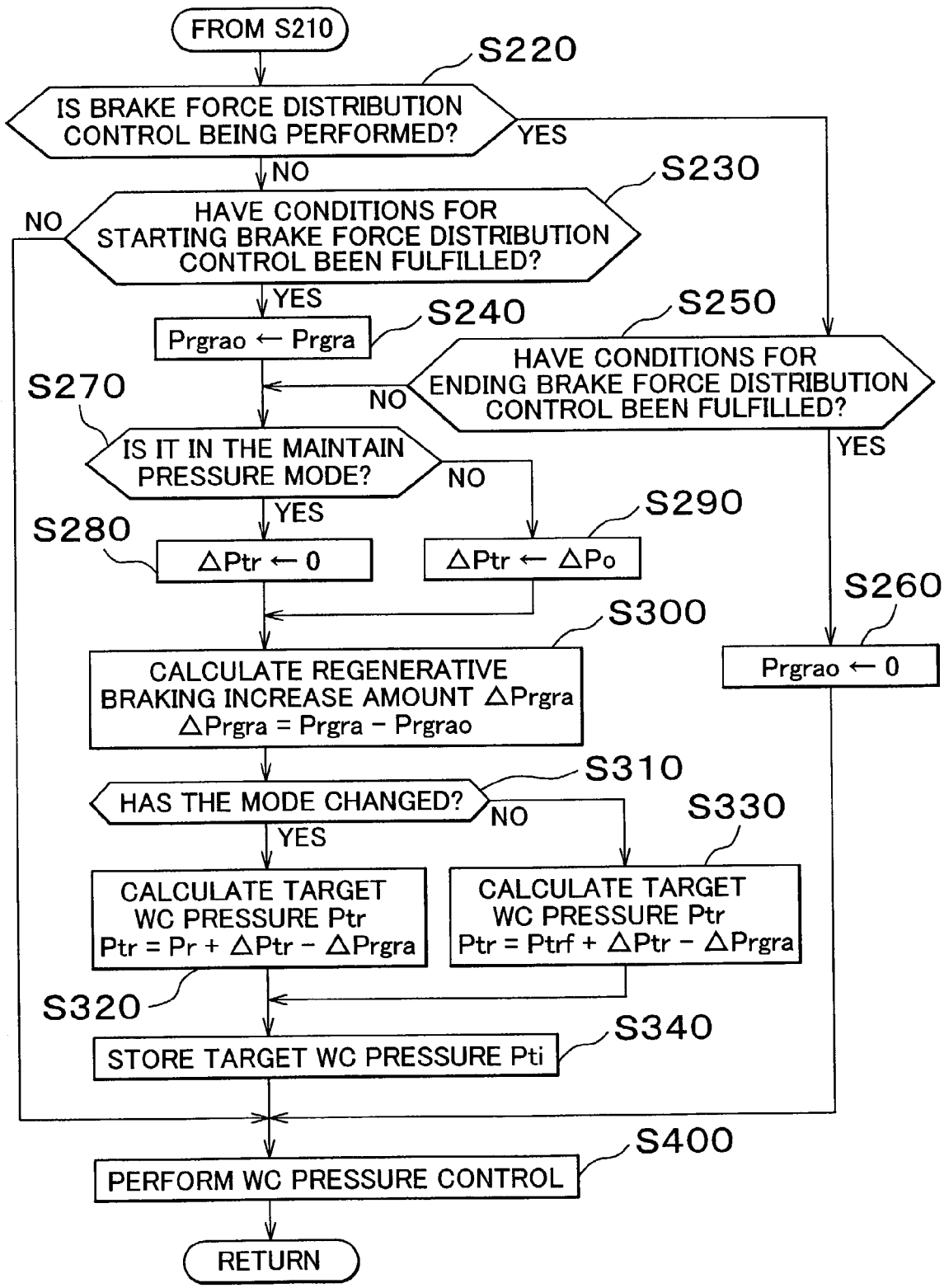
FIG. 15 is a flowchart showing a second half of the brake control routine in the fourth embodiment.

As will be described in detail later, the electronic control unit 76 calculates the final target deceleration Gt of the vehicle, which is the braking amount required by the driver, based on the depression Stroke St of the brake pedal 12 and the mean value Pma of the master cylinder pressure according to a routine shown in FIGS. 14 and 15, which will be described later. Moreover, the electronic control unit 76 calculates front wheel and rear wheel target braking forces Fbft and Fbrt based on the calculated final target deceleration Gt and a predetermined front and rear wheel braking force distribution ratio. With the maximum regenerative force of the regenerative braking systems 130 and 140 denoted as Frgfmax and Frgrmax, respectively, the electronic control unit 76 calculates the value of either the target braking force Fbft or the maximum regenerative braking force Frgfmax, which ever is smaller, as the front wheel target regenerative force Frgft. At the same time, the electronic control unit 76 also calculates either the target braking force Fbrt or the maximum regenerative braking force Frgrmax, whichever is smaller, as the rear wheel target regenerative braking force Frgrt. In addition, the electronic control unit 76 outputs signals indicative of these target regenerative braking forces to the engine control unit 128.

The engine control unit 128 controls the electric generator 114 of the regenerative braking system 130 of the front wheels with the target regenerative braking force Frgft of the front wheels as the upper limit, and calculates an actual regenerative braking force Frgfa by the regenerative braking system 130 of the front wheels based on the voltage and current generated by the electric generator 114. In the same manner, the engine control unit 128 controls the electric generator 142 of the regenerative braking system 140 of the rear wheels with the target regenerative braking force Frgrt of the rear wheels as the upper limit, and calculates an actual regenerative braking force Frgra by the regenerative braking system 140 of the rear wheels based on the voltage and current generated by the electric generator 142. Furthermore, the engine control unit 128 outputs signals indicative of the actual regenerative braking forces Frgfa and Frgra to the electronic control unit 76.

The electronic control unit 76 calculates a value in which the actual regenerative braking force Frgfa is subtracted from the target braking force Fbft as a target friction braking force Fbpft of the front wheels. In addition, the electronic control unit 76 calculates a value in which the actual regenerative braking force Frgra is subtracted from the target braking force Fbrt as a target friction braking force Fbprt of the rear wheels, and calculates target braking pressures Pbtfl and Pbtfr of the left and right front wheels, respectively, based on the target fiction braking force Fbpft of the front wheels. The electronic control unit 76 also calculates target braking pressures Pbtrl and Pbtrr of the left and right rear wheels, respectively, based on the target friction braking force Fbprt of the rear wheels, and then controls the braking pressure of each wheel such that the braking pressure Pi (i=fl, fr, rl, rr) of left and right wheels and left and right rear wheels becomes equal to their corresponding target braking pressures, i.e., become equal to the corresponding target wheel cylinder pressures.

Furthermore, the electronic control unit 76 calculates a difference between a mean value of left and right front-wheel wheel speeds Vwfl and Vwfr and a mean value of left and right rear-wheel wheel speeds Vwrl and Vwrr. The electronic control unit 76 then performs distribution control of the braking force for controlling an increase in braking force of the rear wheels based on the difference when the difference in the wheel speeds becomes equal to, or greater than, a reference value, and such that the braking force of the rear wheels does not become excessive, i.e., such that the slip ratio of the rear wheels does not become higher than the slip ratio of the front wheels.

The electronic control unit 76 also calculates the target wheel cylinder pressure of the rear wheels taking the regenerative braking amount of the rear wheels into consideration, when performing distribution control of the braking force in a situation in which regenerative braking with the rear wheels is being performed. The electronic control unit 76 calculates the target wheel cylinder pressure of the rear wheels based on the actual wheel cylinder pressure particularly when starting the braking force distribution control and when the brake control mode switches between the increase pressure mode and the maintain pressure mode.

Furthermore, although not illustrated, from the time when the conditions to start anti-skid control of one of the wheels are fulfilled to when the conditions for ending anti-skid control are fulfilled, the electronic control unit 76 performs anti-skid control, in which the pressure within the wheel cylinder is increased or decreased such that the brake slip amount of the wheel(s) falls within a predetermined range. Further, the electronic control unit 76 sets the target regenerative braking force Frgft of the front wheels to 0 when anti-skid control is being performed with at least one of the left and right front wheels. The electronic control unit 76 also sets the target regenerative braking force Frgrt of the rear wheels to 0 when anti-skid control is being performed with at least one of the left and right rear wheels.

The control of the driving mode of the hybrid engine 110 and the control of the gasoline engine 112 by the engine control unit 128 are not the main subject matter of this invention, and therefore these controls may be implemented by various methods that are well known in the technical field.

Next, the brake control routine according to the fourth embodiment will be described with reference to the flowchart in FIG. 14 and FIG. 15. The control shown in FIGS. 14 and 15 is performed repeatedly at predetermined intervals of time, starting with when the ignition switch, not shown, is turned on.

First in Step S10, various signals such as signals indicative of the master cylinder pressures detected by the pressure sensors 66 and 68 are read. Steps S22 through S30 are performed just as in the first exemplary embodiment.

In Step S34, Kf and Kr denote the distribution ratio (a positive numerical constant) of the braking force to be applied to the front wheels and rear wheels, respectively, and the target braking force Fbft of the front wheels and the target braking force Fbrt of the rear wheels are calculated according to the following equations 6 and 7, respectively.

$$Fbft = Kf \cdot Gt \quad (6)$$

$$Fbrt = Kr \cdot Gt \quad (7)$$

In Step S36, the target regenerative braking force Frgft of the front wheels and the target regenerative braking force Frgrt of the rear wheels are calculated according to the following equations 8 and 9, respectively. MIN in the following equations means that the smaller of the numerical values in parentheses is selected. Also, the maximum regenerative braking force Frgfmax and Frgrmax may each be positive numerical constants, and may be variably set in accordance with the driving mode of the hybrid engine 110 and the vehicle speed.

$$Frgft = \text{MIN} (Fbft, Frgfmax) \tag{8}$$

$$Frgrt = \text{MIN} (Fbrt, Frgrmax) \tag{9}$$

In Step S38, signals indicative of the actual regenerative braking force Frgfa of the front wheels as well as of the actual regenerative braking force Frgra of the rear wheels achieved by regenerative braking control with the engine control unit 128, which will be described later, are read by the engine control unit 128. In Step S200, the target friction braking force Fbpft of the front wheels and the target friction braking force Fbprt of the rear wheels are calculated according to the following equations 10 and 11, respectively.

$$Fbpft = Fbft - Frgfa \tag{10}$$

$$Fbprt = Fbrt - Frgra \tag{11}$$

In Step S210, the target wheel cylinder pressures Pbtfl and Pbtfr of the left and right front wheels, respectively, are calculated based on the target friction brake pressure Fbpft of the front wheels, and the target wheel cylinder pressures Pbtrl and Pbtrr of the left and right rear wheels, respectively, are calculated based on the target friction brake pressure Fbprt of the rear wheels.

In Step S220, it is determined whether distribution control of the braking force is being performed to prevent the braking force of the rear wheels from becoming excessive. If the determination is YES, the routine proceeds to Step S250. If the determination is NO, then the routine proceeds to Step S230.

In Step S230, the difference between the mean value of the left and right front-wheel wheel speeds Vwfl and Vwfr and the mean value of the left and right rear-wheel wheel speeds Vwrl and Vwrr, for example, is calculated and it is determined whether the conditions for starting the distribution control of the braking force have been fulfilled depending on the determination of whether the difference is equal to, or greater than, a first reference value (a positive numerical constant). If the determination is NO in Step S230, the routine proceeds directly to Step S400. If the determination is YES in Step S230, the routine proceeds to Step S240. In Step S240, the regenerative braking amount Prgra of the rear wheels converted to wheel cylinder pressure is calculated based on the actual regenerative braking force Frgra of the rear wheels, while a reference regenerative braking amount Prgrao of the rear wheels is set to Prgra.

In Step S250, it is determined whether the conditions for ending the distribution control of the braking force have been fulfilled depending on the determination of whether the wheels are stopped or whether the anti-skid control for at least one of the rear wheels has started, for example. If the determination in Step S250 is YES, the routine proceeds to Step S260, where the reference regenerative braking amount Prgrao of the rear wheels returns to 0. If the determination in Step S250 is NO, the routine proceeds to Step S270.

In Step S270, it is determined whether the situation is such that the wheel cylinder pressure of the rear wheels should be maintained, depending on the determination of whether the difference of the wheel speed of the front and rear wheels is equal to, or greater than, a second reference value (a positive numerical constant that is smaller then the first reference value.) If the determination in Step S270 is YES, the routine proceeds to Step S280, where the increase pressure amount ΔPtr of the wheel cylinder pressure of the rear wheels is set to 0. If the determination in Step S270 is NO, i.e., if it is determined that there should be a pressure increase, then the routine proceeds to Step S290. In Step S290, the increase pressure amount ΔPtr of the wheel cylinder pressure of the rear wheels is set to ΔPo (a positive numerical constant).

In Step S300, the amount of change ΔPrgra in the actual regenerative braking amount from the time of starting the distribution control of the braking force is calculated according to the following equation 12.

$$\Delta Prgra = Prgra - Prgrao \tag{12}$$

In Step S310, it is determined whether the brake force distribution control mode has changed from the maintain pressure mode to the increase pressure mode or from the increase pressure mode to the maintain pressure mode. If the determination is YES, the routine proceeds to Step S320. In Step S320, the target wheel cylinder pressure Ptr (=Ptrl= Ptrr) of the right and left rear wheels is calculated from the actual wheel cylinder pressure Pr (=Prl=Prr) of the right and left rear wheels according to equation 13 below. If the determination in Step S310 is NO, the routine proceeds to Step S330. In Step S330, the target wheel cylinder pressure Ptr of the right and left rear wheels is calculated with Ptrf as the most recent target wheel cylinder pressure of the right and left rear wheels, according to the equation 14 below.

$$Ptr = Pr + \Delta Ptr - \Delta Prgra \tag{13}$$

$$Ptr = Ptrf + \Delta Ptr - \Delta Prgra \tag{14}$$

In Step S340, the target wheel cylinder pressure Ptr of the left and right rear wheels is stored in memory such as RAM as Ptrf for the next time. Step S400 is performed in the same manner as in the other exemplary embodiments described above. As a result, the wheel cylinder pressure Pi of the left and right front wheels and left and right rear wheels is controlled so as to become equal to the target wheel cylinder pressure Pti.

Therefore, according to the fourth exemplary embodiment, the target brake force of each wheel is calculated in Steps S22 through S34 based on the braking amount by the driver. In Step S36, the target regenerative braking force of the front wheels and rear wheels is calculated to be as high as possible. In Steps S38 and S200, the target friction braking force Fbpft and Fbprt are calculated as the difference of the actual regenerative braking force subtracted from the target braking force. In Step S210, the target wheel cylinder pressure Pti of each wheel is calculated based on the target friction braking force.

When the conditions for starting the brake force distribution control have been fulfilled, the determination in Step S230 is YES and the routine proceeds to Step S240, where the regenerative braking amount Pttra of the rear wheels is calculated based on the actual regenerative brake force Fttra of the rear wheels, while the reference regenerative braking amount Prgrao of the rear wheels is set to Prgra. Further, when brake force distribution control is being performed, the increase pressure amount ΔPtr of the wheel cylinder pressure of the rear wheels is calculated in Steps S270 through S290 based on the difference of the wheel speed, and the regenerative brake increase amount ΔPtgra from the point at which the brake force distribution control started is calculated in Step S300.

Moreover, in Steps S310 through S330, when there is no change in the brake control mode, the target wheel cylinder pressure Ptr of the rear wheels is calculated based on the most recent target wheel cylinder pressure Ptrf, the increase pressure amount ΔPtr, and the regenerative brake increase amount ΔPrgra. When there has been a change in the brake control mode, the target wheel cylinder pressure Ptr of the rear wheels is calculated based on the actual target wheel cylinder pressure Pr of the rear wheels, the increase pressure amount Δ Ptr, and the regenerative brake increase amount ΔPrgra.

Therefore, according to the fourth exemplary embodiment, not only is the regenerative braking efficiency increased by increasing the regenerative braking amount as much as possible; but distribution control of the brake force can be performed without affecting the regenerative braking or being adversely affected by the regenerative braking. As a result, it is possible to reliably prevent the brake force of the rear wheels from becoming excessive, as well as reliably prevent losing a stable driving state of the vehicle as a result of the brake force of the rear wheels becoming excessive.

In particular, according to the fourth exemplary embodiment, the target wheel cylinder pressure Ptr of the rear wheels is calculated based on the actual wheel cylinder pressure Pr of the rear wheels not only when starting distribution control of the brake force, but also when the brake control mode switches between the increase pressure mode and the maintain pressure mode. As a result, even when the brake control mode changes, the target wheel cylinder pressure Ptr of the rear wheels is calculated to a more appropriate value than compared to when the target wheel cylinder pressure Ptr is calculated based on the most recent target wheel cylinder pressure Ptrf of the rear wheels. Accordingly, distribution control of the brake force is able to be appropriately performed.

In the foregoing fourth exemplary embodiment, the increase pressure amount ΔPr when the brake control mode is the increase pressure mode is constant. However, according to another exemplar embodiment, the increase amount ΔPr can also be variably set in Step S280 according to the difference of the wheel speed so as to become larger the smaller the difference of the wheel speed, for example.

According to the foregoing exemplary embodiments, the electromagnetic switching valve 64F and the electromagnetic switching valve 64R are open during normal operation, except for when anti-skid control such as ABS control is being performed. However, the foregoing embodiment can be modified such that the electromagnetic switching valves 64F and 64R are closed during normal operation such that the pressure of the wheel cylinder 22FR and the wheel cylinder 22RR is controlled by the oil pump 36. According to this modified embodiment, when the linear valve 50FR is damaged, the electromagnetic switching valve 64F opens such that the pressure of the wheel cylinder 22FR is able to be controlled by the pressure from the master cylinder via the brake hydraulic supply line 18. Further, when the linear valve 50RR is damaged, the electromagnetic switching valve 64R opens such that the pressure of the wheel cylinder 22RR is able to be controlled by the pressure from the master cylinder via the brake hydraulic supply line 20. Then, when starting ABS control, the electromagnetic switching valves 64F and 64R close such that the pressures of the wheel cylinders 22FL, 22FR, 22FR, 22RR are able to each be controlled independently.

Although the invention has been described herein with reference to specific embodiments, many modifications and variations therein will readily occur to those skilled in the art. Accordingly, all such variations and modifications are included within the intended scope of the invention.

For example, in each of the above exemplary embodiments the brake control system is a hydraulic brake system in which the brake force is increased or decreased according to an increase or decrease in the wheel cylinder pressure. However, a brake control system according to an embodiment of this invention can also be applied to an electronic brake system having an electronic pressure exerting device such as an electric motor for pressing a friction member such as a brake pad against a rotating member such as a brake rotor provided in a wheel. In this case, the target wheel cylinder pressure and the actual wheel cylinder pressure are set to the target pressing force and the actual pressing force, respectively. The target increase/decrease pressure slope is set to the target increase/decrease force slope and the increase pressure and decrease pressure of the brake control mode are set to an increase force and a decrease force, respectively. As a detector for detecting the actual pressing force in this case, a sensor for detecting deformation of the rotating member and the friction member, or a device for measuring a driving amount of the pressure exerting device (the stroke or number of revolutions of the motor when using a motor as the pressure exerting device), or the like may be used.

Also, in each of the aforementioned exemplary embodiments, the final target deceleration Gt as the braking amount by the driver is calculated based on the mean value Pma of the master cylinder pressure and the stroke St of the brake pedal. However, the braking amount by the driver can also be calculated by other various methods that are well known in the technical field.

Also, according to the foregoing first through third exemplary embodiments, the predetermined brake control is anti-skid control. However, according to another exemplary embodiment, the predetermined brake control can be a brake force control-type traction control or a control for stabilizing vehicle behavior. Moreover, the brake force distribution control according to the foregoing first through third exemplary embodiments can be combined with that of the fourth exemplary embodiment.

In the illustrated embodiment, the apparatus is controlled by the controller (e.g., the electronic control unit 76), which is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A brake control system for a vehicle, comprising:
   at least one linear valve that selectively increases and decreases wheel cylinder pressure by controlling a supply and discharge of an operating fluid with respect to a plurality of wheel cylinders;
   a detector that detects the wheel cylinder pressure; and
   a controller that obtains a target increase/decrease pressure slope of the wheel cylinder pressure in accordance with a rotating state of each of a plurality of wheels of the vehicle, calculates target wheel cylinder pressure based on the target increase/decrease pressure slope and the detected wheel cylinder pressure when starting a predetermined brake control operation, and controls the linear valve such that the wheel cylinder pressure becomes the target wheel cylinder pressure, wherein the target increase/decrease pressure slope represents an amount of a change in the wheel cylinder pressure per unit time, wherein the controller calculates the target wheel cylinder pressure based on the target increase/decrease pressure slope and the detected wheel cylinder pressure in at least one of a case where the detected wheel cylinder pressure overshoots the target wheel cylinder pressure during a pressure increase operation and a case where the detected wheel cylinder pressure undershoots the target wheel cylinder pressure during a pressure decrease operation.

2. The brake control system according to claim 1, wherein the controller calculates the target wheel cylinder pressure based on the target increase/decrease pressure slope and a most recent target wheel cylinder pressure after starting the predetermined brake control operation.

3. The brake control system according to claim 2, wherein the controller selectively controls the at least one linear valve according to one of an increase pressure mode, a maintain pressure mode, and a decrease pressure mode, and calculates the target wheel cylinder pressure based on the target increase/decrease pressure slope and the detected wheel cylinder pressure when the mode switches to another of the increase pressure mode, the maintain pressure mode and the decrease pressure mode.

4. The brake control system according to claim 1, wherein the at least one linear valve includes a first linear valve for increasing the wheel cylinder pressure and a second linear valve for decreasing the wheel cylinder pressure.

5. The brake control system according to claim 1, wherein the controller determines that the overshoot has occurred when the detected wheel cylinder pressure becomes greater than the target wheel cylinder pressure during the pressure increase operation, and determines that the undershoot has occurred when the detected wheel cylinder pressure becomes less than the target wheel cylinder pressure during the pressure decrease operation.

6. The brake control system according to claim 1, wherein the predetermined brake control operation is a slip control operation for at least one of said plurality of wheels.

7. A brake control system for a vehicle, comprising:
   at least one linear valve that selectively increases and decreases wheel cylinder pressure by controlling a supply and discharge of an operating fluid with respect to a plurality of wheel cylinders;
   a detector that detects the wheel cylinder pressure;
   a controller that obtains a target increase/decrease pressure slope of the wheel cylinder pressure in accordance with a rotating state of each of a plurality of wheels of the vehicle, calculates target wheel cylinder pressure based on the target increase/decrease pressure slope and the detected wheel cylinder pressure when starting a predetermined brake control operation, and controls the linear valve such that the wheel cylinder pressure becomes the target wheel cylinder pressure, wherein the target increase/decrease pressure slope represents an amount of a change in the wheel cylinder pressure per unit time,
   the vehicle has a regenerative braking system, and
   the controller calculates the target wheel cylinder pressure based on the target increase/decrease pressure slope, the detected wheel cylinder pressure, and a regenerative braking amount generated by the regenerative braking system when starting the predetermined brake control operation during operation of the regenerative braking system.

8. The brake control system according to claim 7, wherein, after starting the predetermined brake control operation, the controller calculates a fluctuation amount of the regenerative braking amount based on the regenerative braking amount when starting the predetermined brake control operation, and calculates the target wheel cylinder pressure based on the target increase/decrease pressure slope, a most recent target wheel cylinder pressure, and the fluctuation amount of the regenerative braking amount.

9. The brake control system according to claim 8, wherein the predetermined brake control operation is a brake force distribution control operation for suppressing a brake force of a rear wheel from becoming excessive, and wherein the controller controls the linear valve of the rear wheel according to at least one of an increase pressure mode and a maintain pressure mode while the brake force distribution control operation is being performed, and calculates the target wheel cylinder pressure based on the target increase/decrease pressure slope, the detected wheel cylinder pressure, and the fluctuation amount of the regenerative braking amount when the mode switches.

10. The brake control system according to claim 7, wherein the at least one linear valve includes a first linear valve for increasing the wheel cylinder pressure and a second linear valve for decreasing the wheel cylinder pressure.

11. A brake control system for a vehicle, comprising:
    at least one linear valve that selectively increases and decreases wheel cylinder pressure by controlling a supply and discharge of an operating fluid with respect to a plurality of wheel cylinders;
    a detector that detects the wheel cylinder pressure; and
    a controller that obtains a target increase/decrease pressure slope of the wheel cylinder pressure in accordance with a rotating state of each of a plurality of wheels of the vehicle, calculates target wheel cylinder pressure based on the target increase/decrease pressure slope and the detected wheel cylinder pressure when starting a predetermined brake control operation, and controls the linear valve such that the wheel cylinder pressure becomes the target wheel cylinder pressure, wherein the target increase/decrease pressure slope represents an amount of a change in the wheel cylinder pressure per unit time, wherein the plurality of wheel cylinders includes a first wheel cylinder and a second wheel cylinder; and the brake control system comprises a first passage connecting the first wheel cylinder and a reservoir for storing the operating fluid, and a second passage for connecting the second wheel cylinder and a master cylinder for supplying the second wheel cylinder with the operating fluid, and wherein:

the at least one linear valve is provided in the first passage;

the brake control system has a high pressure source provided between the reservoir and the linear valve, which supplies the operating fluid at a high pressure to the first passage, a third passage for connecting the second passage and the first passage between the at least one linear valve and the second wheel cylinder, and a communication control valve provided in the third passage; and the controller closes the communication control valve at least when starting the predetermined brake control operation.

12. The brake control system according to claim 11, wherein the at least one linear valve includes a first linear valve for increasing the wheel cylinder pressure and a second linear valve for decreasing the wheel cylinder pressure.

13. A method for controlling a brake system of a vehicle, comprising:

determining whether a condition for starting a predetermined brake control operation has been fulfilled;

obtaining a target increase/decrease pressure slope of a wheel cylinder pressure in accordance with a rotating state of a wheel, the target increase/decrease pressure slope representing an amount of a change in the wheel cylinder pressure per unit time;

detecting actual wheel cylinder pressure;

calculating a target wheel cylinder pressure based on the target increase/decrease pressure slope and the detected actual wheel cylinder pressure when starting the predetermined brake control operation if it has been determined that the condition for starting the predetermined brake control operation has been fulfilled; and controlling the wheel cylinder pressure to become equal to the target wheel cylinder pressure, wherein the target wheel cylinder pressure is calculated in at least one of a case where the detected wheel cylinder pressure overshoots the target wheel cylinder pressure during a pressure increase operation and a case where the detected wheel cylinder pressure undershoots the target wheel cylinder pressure during a pressure decrease operation.

14. A method for controlling a brake system of a vehicle, comprising:

determining whether a condition for starting a predetermined brake control operation has been fulfilled;

obtaining a target increase/decrease pressure slope of a wheel cylinder pressure in accordance with a rotating state of a wheel, the target increase/decrease pressure slope representing an amount of a change in the wheel cylinder pressure per unit time;

detecting actual wheel cylinder pressure;

calculating a target wheel cylinder pressure based on the target increase/decrease pressure slope and the detected actual wheel cylinder pressure when starting the predetermined brake control operation if it has been determined that the condition for starting the predetermined brake control operation has been fulfilled; and controlling the wheel cylinder pressure to become equal to the target wheel cylinder pressure, wherein the vehicle has a regenerative braking system; and calculating a regenerative braking amount generated by the regenerative braking system when starting the predetermined brake control operation during operation of the regenerative braking system, and the target wheel cylinder pressure is then calculated based on the target increase/decrease pressure slope, the detected actual wheel cylinder pressure, and the regenerative braking amount generated by the regenerative braking system.

15. A method for controlling a brake system of a vehicle, comprising:

determining whether a condition for starting a predetermined brake control operation has been fulfilled;

obtaining a target increase/decrease pressure slope of a wheel cylinder pressure in accordance with a rotating state of a wheel, the target increase/decrease pressure slope representing an amount of a change in the wheel cylinder pressure per unit time;

detecting actual wheel cylinder pressure;

calculating a target wheel cylinder pressure based on the target increase/decrease pressure slope and the detected actual wheel cylinder pressure when starting the predetermined brake control operation if it has been determined that the condition for starting the predetermined brake control operation has been fulfilled; and controlling the wheel cylinder pressure to become equal to the target wheel cylinder pressure, wherein the plurality of wheel cylinders includes a first wheel cylinder and a second wheel cylinder; and the brake control system comprises a first passage connecting the first wheel cylinder and a reservoir for storing the operating fluid, and a second passage for connecting the second wheel cylinder and a master cylinder for supplying the second wheel cylinder with the operating fluid, and wherein:

the at least one linear valve is provided in the first passage;

the brake control system has a high pressure source provided between the reservoir and the linear valve, which supplies the operating fluid at a high pressure to the first passage, a third passage for connecting the second passage and the first passage between the at least one linear valve and the second wheel cylinder, and a communication control valve provided in the third passage; and the communication control valve is closed at least when starting the predetermined brake control operation.

* * * * *